United States Patent
Tammera et al.

(10) Patent No.: US 11,260,339 B2
(45) Date of Patent: *Mar. 1, 2022

(54) APPARATUS AND SYSTEM FOR SWING ADSORPTION PROCESSES RELATED THERETO

(71) Applicant: ExxonMobil Upstream Research Company, Spring, TX (US)

(72) Inventors: Robert F. Tammera, Warrenton, VA (US); Bruce T. Kelley, Porter, TX (US); Sebastian Chialvo, Spring, TX (US); Ananda K. Nagavarapu, Houston, TX (US); William Barnes, Spring, TX (US); Tracy A. Fowler, Magnolia, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 104 days.

This patent is subject to a terminal disclaimer.

(21) Appl. No.: 16/545,667

(22) Filed: Aug. 20, 2019

(65) Prior Publication Data

US 2019/0366261 A1     Dec. 5, 2019

Related U.S. Application Data

(62) Division of application No. 15/450,618, filed on Mar. 6, 2017, now Pat. No. 10,427,088.

(Continued)

(51) Int. Cl.
*B01D 53/04*     (2006.01)
*B01D 53/047*     (2006.01)
*B01D 53/26*     (2006.01)

(52) U.S. Cl.
CPC ..... *B01D 53/0446* (2013.01); *B01D 53/0407* (2013.01); *B01D 53/047* (2013.01);

(Continued)

(58) Field of Classification Search
CPC .. B01D 53/04; B01D 53/047; B01D 53/0446; B01D 53/0473; B01D 53/261;

(Continued)

(56) References Cited

U.S. PATENT DOCUMENTS

| 1,868,138 A | 7/1932 | Fisk |
| 2,625,237 A * | 1/1953 | Gribler ................ B01D 53/26 96/126 |

(Continued)

FOREIGN PATENT DOCUMENTS

| CN | 202376890 | 8/2012 |
| EP | 0257493 | 2/1988 |

(Continued)

OTHER PUBLICATIONS

U.S. Appl. No. 16/252,975, filed Jan. 21, 2019, Krishna Nagavarapu et al.

(Continued)

*Primary Examiner* — Frank M Lawrence, Jr.
(74) *Attorney, Agent, or Firm* — ExxonMobil Upstream Research Company—Law Department

(57) ABSTRACT

Provided are apparatus and systems for performing a swing adsorption process. This swing adsorption process may involve passing streams through adsorbent bed units to remove contaminants, such as water, from the stream. As part of the process, the adsorbent bed unit may provide access to the adsorbent material within the adsorbent bed unit without having to remove one or more of valves, conduits and manifolds.

20 Claims, 14 Drawing Sheets

Related U.S. Application Data

(60) Provisional application No. 62/310,289, filed on Mar. 18, 2016.

(52) U.S. Cl.
CPC ....... *B01D 53/0473* (2013.01); *B01D 53/261* (2013.01); *B01D 2253/102* (2013.01); *B01D 2253/104* (2013.01); *B01D 2253/106* (2013.01); *B01D 2253/108* (2013.01); *B01D 2253/204* (2013.01); *B01D 2257/504* (2013.01); *B01D 2257/80* (2013.01); *B01D 2259/40003* (2013.01); *B01D 2259/40084* (2013.01); *B01D 2259/40086* (2013.01)

(58) Field of Classification Search
CPC .......... B01D 53/0407; B01D 2253/102; B01D 2253/104; B01D 2253/106; B01D 2253/108; B01D 2253/204; B01D 2257/80; B01D 2257/504; B01D 2259/40003; B01D 2259/40084; B01D 2259/40086; Y02C 20/40
USPC ......... 95/90, 96; 96/108, 121, 139, 151, 152
See application file for complete search history.

(56) References Cited

U.S. PATENT DOCUMENTS

| | | |
|---|---|---|
| 3,103,425 A | 9/1963 | Meyer |
| 3,124,152 A | 3/1964 | Payne |
| 3,142,547 A | 7/1964 | Marsh et al. |
| 3,508,758 A | 4/1970 | Strub |
| 3,594,983 A | 7/1971 | Yearout |
| 3,602,247 A | 8/1971 | Bunn et al. |
| 3,788,036 A | 1/1974 | Lee et al. |
| 3,967,464 A | 7/1976 | Cormier et al. |
| 4,187,092 A | 2/1980 | Woolley |
| 4,261,815 A | 4/1981 | Kelland |
| 4,324,565 A | 4/1982 | Benkmann |
| 4,325,565 A | 4/1982 | Winchell |
| 4,329,162 A | 5/1982 | Pitcher |
| 4,340,398 A | 7/1982 | Doshi et al. |
| 4,386,947 A | 6/1983 | Mizuno et al. |
| 4,421,531 A | 12/1983 | Dalton, Jr. et al. |
| 4,445,441 A | 5/1984 | Tanca |
| 4,461,630 A | 7/1984 | Cassidy et al. |
| 4,496,376 A | 1/1985 | Hradek |
| 4,559,065 A | 12/1985 | Null et al. |
| 4,631,073 A | 12/1986 | Null et al. |
| 4,693,730 A | 9/1987 | Miller et al. |
| 4,705,627 A | 11/1987 | Miwa et al. |
| 4,711,968 A | 12/1987 | Oswald et al. |
| 4,737,170 A | 4/1988 | Searle |
| 4,770,676 A | 9/1988 | Sircar et al. |
| 4,783,205 A | 11/1988 | Searle |
| 4,784,672 A | 11/1988 | Sircar |
| 4,790,272 A | 12/1988 | Woolenweber |
| 4,802,899 A * | 2/1989 | Vrana ................ B01D 53/0407 96/109 |
| 4,814,146 A | 3/1989 | Brand et al. |
| 4,816,039 A | 3/1989 | Krishnamurthy et al. |
| 4,877,429 A | 10/1989 | Hunter |
| 4,883,190 A * | 11/1989 | Thomas, Jr. ......... B65D 79/005 220/624 |
| 4,891,051 A * | 1/1990 | Frantz ................ B01D 53/0454 55/475 |
| 4,977,745 A | 12/1990 | Heichberger |
| 5,110,328 A | 5/1992 | Yokota et al. |
| 5,114,441 A * | 5/1992 | Kanner ............. B01D 53/0407 95/98 |
| 5,125,934 A | 6/1992 | Krishnamurthy et al. |
| 5,169,006 A | 12/1992 | Stelzer |
| 5,174,796 A | 12/1992 | Davis et al. |
| 5,224,350 A | 7/1993 | Mehra |
| 5,234,472 A | 8/1993 | Krishnamurthy et al. |
| 5,292,990 A | 3/1994 | Kantner et al. |
| 5,306,331 A | 4/1994 | Auvil et al. |
| 5,354,346 A | 10/1994 | Kumar |
| 5,365,011 A | 11/1994 | Ramachandran et al. |
| 5,370,728 A | 12/1994 | LaSala et al. |
| 5,486,227 A | 1/1996 | Kumar et al. |
| 5,547,641 A | 8/1996 | Smith et al. |
| 5,565,018 A | 10/1996 | Baksh et al. |
| 5,672,196 A | 9/1997 | Acharya et al. |
| 5,700,310 A | 12/1997 | Bowman et al. |
| 5,733,451 A | 3/1998 | Coellner et al. |
| 5,735,938 A | 4/1998 | Baksh et al. |
| 5,750,026 A | 5/1998 | Gadkaree et al. |
| 5,769,928 A | 6/1998 | Leavitt |
| 5,779,768 A | 7/1998 | Anand et al. |
| 5,792,239 A | 8/1998 | Reinhold, III et al. |
| 5,807,423 A | 9/1998 | Lemcoff et al. |
| 5,811,616 A | 9/1998 | Holub et al. |
| 5,827,358 A | 10/1998 | Kulish et al. |
| 5,882,380 A | 3/1999 | Sircar |
| 5,891,217 A * | 4/1999 | Lemcoff ............ B01D 53/0446 95/130 |
| 5,906,673 A | 5/1999 | Reinhold, III et al. |
| 5,912,426 A | 6/1999 | Smolarek. et al. |
| 5,914,294 A | 6/1999 | Park et al. |
| 5,924,307 A | 7/1999 | Nenov |
| 5,935,444 A | 8/1999 | Johnson et al. |
| 5,968,234 A | 10/1999 | Midgett, II et al. |
| 5,976,221 A | 11/1999 | Bowman et al. |
| 5,997,617 A | 12/1999 | Czabala et al. |
| 6,007,606 A | 12/1999 | Baksh et al. |
| 6,011,192 A | 1/2000 | Baker et al. |
| 6,023,942 A | 2/2000 | Thomas et al. |
| 6,053,966 A | 4/2000 | Moreau et al. |
| 6,063,161 A | 5/2000 | Keefer et al. |
| 6,096,115 A | 8/2000 | Kleinberg |
| 6,099,621 A | 8/2000 | Ho |
| 6,102,985 A | 8/2000 | Naheiri et al. |
| 6,129,780 A | 10/2000 | Millet et al. |
| 6,136,222 A | 10/2000 | Friesen et al. |
| 6,147,126 A | 11/2000 | DeGeorge et al. |
| 6,152,991 A | 11/2000 | Ackley |
| 6,156,101 A | 12/2000 | Naheiri |
| 6,171,371 B1 | 1/2001 | Derive et al. |
| 6,176,897 B1 | 1/2001 | Keefer |
| 6,179,900 B1 | 1/2001 | Behling et al. |
| 6,183,538 B1 | 2/2001 | Naheiri |
| 6,194,079 B1 | 2/2001 | Hekal |
| 6,210,466 B1 | 4/2001 | Whysall et al. |
| 6,231,302 B1 | 5/2001 | Bonardi |
| 6,245,127 B1 | 6/2001 | Kane et al. |
| 6,284,021 B1 | 9/2001 | Lu et al. |
| 6,311,719 B1 | 11/2001 | Hill et al. |
| 6,345,954 B1 | 2/2002 | Al-Himyary et al. |
| 6,398,853 B1 | 6/2002 | Keefer et al. |
| 6,402,813 B2 | 6/2002 | Monereau et al. |
| 6,406,523 B1 | 6/2002 | Connor et al. |
| 6,425,938 B1 | 7/2002 | Xu et al. |
| 6,432,379 B1 | 8/2002 | Heung |
| 6,436,171 B1 | 8/2002 | Wang et al. |
| 6,444,012 B1 | 9/2002 | Dolan et al. |
| 6,444,014 B1 | 9/2002 | Mullhaupt et al. |
| 6,444,523 B1 | 9/2002 | Fan et al. |
| 6,444,610 B1 | 9/2002 | Yamamoto |
| 6,451,095 B1 | 9/2002 | Keefer et al. |
| 6,457,485 B2 | 10/2002 | Hill et al. |
| 6,458,187 B1 | 10/2002 | Fritz et al. |
| 6,464,761 B1 | 10/2002 | Bugli |
| 6,471,749 B1 | 10/2002 | Kawai et al. |
| 6,471,939 B1 | 10/2002 | Boix et al. |
| 6,488,747 B1 | 12/2002 | Keefer |
| 6,497,750 B2 | 12/2002 | Butwell et al. |
| 6,500,234 B1 | 12/2002 | Ackley et al. |
| 6,500,241 B2 | 12/2002 | Reddy |
| 6,500,404 B1 | 12/2002 | Fernandez et al. |
| 6,503,299 B2 | 1/2003 | Baksh et al. |
| 6,506,351 B1 | 1/2003 | Jain et al. |
| 6,514,318 B2 | 2/2003 | Keefer |

(56) References Cited

U.S. PATENT DOCUMENTS

| | | |
|---|---|---|
| 6,514,319 B2 | 2/2003 | Keefer et al. |
| 6,517,609 B1 | 2/2003 | Monereau et al. |
| 6,531,516 B2 | 3/2003 | Davis et al. |
| 6,533,846 B1 | 3/2003 | Keefer et al. |
| 6,565,627 B1 | 5/2003 | Golden et al. |
| 6,565,635 B2 | 5/2003 | Keefer et al. |
| 6,565,825 B2 | 5/2003 | Ohji et al. |
| 6,572,678 B1 | 6/2003 | Wijmans et al. |
| 6,579,341 B2 | 6/2003 | Baker et al. |
| 6,593,541 B1 | 7/2003 | Herren |
| 6,595,233 B2 | 7/2003 | Pulli |
| 6,605,136 B1 | 8/2003 | Graham et al. |
| 6,607,584 B2 | 8/2003 | Moreau et al. |
| 6,630,012 B2 | 10/2003 | Wegeng et al. |
| 6,631,626 B1 | 10/2003 | Hahn |
| 6,641,645 B1 | 11/2003 | Lee et al. |
| 6,651,645 B1 | 11/2003 | Nunez-Suarez |
| 6,660,064 B2 | 12/2003 | Golden et al. |
| 6,660,065 B2 | 12/2003 | Byrd et al. |
| 6,692,626 B2 | 2/2004 | Keefer et al. |
| 6,712,087 B2 | 3/2004 | Hill et al. |
| 6,742,507 B2 | 6/2004 | Keefer et al. |
| 6,746,515 B2 | 6/2004 | Wegeng et al. |
| 6,752,852 B1 | 6/2004 | Jacksier et al. |
| 6,770,120 B2 | 8/2004 | Neu et al. |
| 6,773,225 B2 | 8/2004 | Yuri et al. |
| 6,802,889 B2 | 10/2004 | Graham et al. |
| 6,814,771 B2 | 11/2004 | Scardino et al. |
| 6,835,354 B2 | 12/2004 | Woods et al. |
| 6,840,985 B2 | 1/2005 | Keefer |
| 6,866,950 B2 | 3/2005 | Connor et al. |
| 6,889,710 B2 | 5/2005 | Wagner |
| 6,890,376 B2 | 5/2005 | Arquin et al. |
| 6,893,483 B2 | 5/2005 | Golden et al. |
| 6,902,602 B2 | 6/2005 | Keefer et al. |
| 6,916,358 B2 | 7/2005 | Nakamura et al. |
| 6,918,953 B2 | 7/2005 | Lomax, Jr. et al. |
| 6,921,597 B2 | 7/2005 | Keefer et al. |
| 6,974,496 B2 | 12/2005 | Wegeng et al. |
| 7,025,801 B2 | 4/2006 | Monereau |
| 7,027,929 B2 | 4/2006 | Wang |
| 7,029,521 B2 | 4/2006 | Johansson |
| 7,074,323 B2 | 7/2006 | Ghijsen |
| 7,077,891 B2 | 7/2006 | Jaffe et al. |
| 7,087,331 B2 | 8/2006 | Keefer et al. |
| 7,094,275 B2 | 8/2006 | Keefer et al. |
| 7,097,925 B2 | 8/2006 | Keefer et al. |
| 7,112,239 B2 | 9/2006 | Kimbara et al. |
| 7,117,669 B2 | 10/2006 | Kaboord et al. |
| 7,122,073 B1 | 10/2006 | Notaro et al. |
| 7,128,775 B2 | 10/2006 | Celik et al. |
| 7,144,016 B2 | 12/2006 | Gozdawa |
| 7,160,356 B2 | 1/2007 | Koros et al. |
| 7,160,367 B2 | 1/2007 | Babicki et al. |
| 7,166,149 B2 | 1/2007 | Dunne et al. |
| 7,172,645 B1 | 2/2007 | Pfister et al. |
| 7,189,280 B2 | 3/2007 | Alizadeh-Khiavi et al. |
| 7,243,679 B2 | 7/2007 | Thelen |
| 7,250,073 B2 | 7/2007 | Keefer et al. |
| 7,250,074 B2 | 7/2007 | Tonkovich et al. |
| 7,255,727 B2 | 8/2007 | Monereau et al. |
| 7,258,725 B2 | 8/2007 | Ohmi et al. |
| 7,276,107 B2 | 10/2007 | Baksh et al. |
| 7,279,029 B2 | 10/2007 | Occhialini et al. |
| 7,285,350 B2 | 10/2007 | Keefer et al. |
| 7,297,279 B2 | 11/2007 | Johnson et al. |
| 7,311,763 B2 | 12/2007 | Neary |
| RE40,006 E | 1/2008 | Keefer et al. |
| 7,314,503 B2 | 1/2008 | Landrum et al. |
| 7,354,562 B2 | 4/2008 | Ying et al. |
| 7,387,849 B2 | 6/2008 | Keefer et al. |
| 7,390,350 B2 | 6/2008 | Weist, Jr. et al. |
| 7,404,846 B2 | 7/2008 | Golden et al. |
| 7,438,079 B2 | 10/2008 | Cohen et al. |
| 7,449,049 B2 | 11/2008 | Thomas et al. |
| 7,456,131 B2 | 11/2008 | Klett et al. |
| 7,510,601 B2 | 3/2009 | Whitley et al. |
| 7,527,670 B2 | 5/2009 | Ackley et al. |
| 7,553,568 B2 | 6/2009 | Keefer |
| 7,578,864 B2 | 8/2009 | Watanabe et al. |
| 7,604,682 B2 | 10/2009 | Seaton |
| 7,637,989 B2 | 12/2009 | Bong |
| 7,641,716 B2 | 1/2010 | Lomax, Jr. et al. |
| 7,645,324 B2 | 1/2010 | Rode et al. |
| 7,651,549 B2 | 1/2010 | Whitley |
| 7,674,319 B2 | 3/2010 | Lomax, Jr. et al. |
| 7,674,539 B2 | 3/2010 | Keefer et al. |
| 7,687,044 B2 | 3/2010 | Keefer et al. |
| 7,713,333 B2 | 5/2010 | Rege et al. |
| 7,717,981 B2 | 5/2010 | LaBuda et al. |
| 7,722,700 B2 | 5/2010 | Sprinkle |
| 7,731,782 B2 | 6/2010 | Kelley et al. |
| 7,740,687 B2 | 6/2010 | Reinhold, III |
| 7,744,676 B2 | 6/2010 | Leitmayr et al. |
| 7,744,677 B2 | 6/2010 | Barclay et al. |
| 7,758,051 B2 | 7/2010 | Roberts-Haritonov et al. |
| 7,758,988 B2 | 7/2010 | Keefer et al. |
| 7,763,098 B2 | 7/2010 | Alizadeh-Khiavi et al. |
| 7,763,099 B2 | 7/2010 | Verma et al. |
| 7,792,983 B2 | 9/2010 | Mishra et al. |
| 7,793,675 B2 | 9/2010 | Cohen et al. |
| 7,806,965 B2 | 10/2010 | Stinson |
| 7,819,948 B2 | 10/2010 | Wagner |
| 7,828,877 B2 | 11/2010 | Sawada et al. |
| 7,828,880 B2 | 11/2010 | Moriya et al. |
| 7,854,793 B2 | 12/2010 | Rarig et al. |
| 7,858,169 B2 | 12/2010 | Yamashita |
| 7,862,645 B2 | 1/2011 | Whitley et al. |
| 7,867,320 B2 | 1/2011 | Baksh et al. |
| 7,902,114 B2 | 3/2011 | Bowie et al. |
| 7,938,886 B2 | 5/2011 | Hershkowitz et al. |
| 7,947,118 B2 | 5/2011 | Rarig et al. |
| 7,947,120 B2 | 5/2011 | Deckman et al. |
| 7,959,720 B2 | 6/2011 | Deckman et al. |
| 8,016,918 B2 | 9/2011 | LaBuda et al. |
| 8,034,164 B2 | 10/2011 | Lomax, Jr. et al. |
| 8,071,063 B2 | 12/2011 | Reyes et al. |
| 8,128,734 B2 | 3/2012 | Song |
| 8,142,745 B2 | 3/2012 | Reyes et al. |
| 8,142,746 B2 | 3/2012 | Reyes et al. |
| 8,192,709 B2 | 6/2012 | Reyes et al. |
| 8,210,772 B2 | 7/2012 | Gillecriosd |
| 8,227,121 B2 | 7/2012 | Adams et al. |
| 8,262,773 B2 | 9/2012 | Northrop et al. |
| 8,262,783 B2 | 9/2012 | Stoner et al. |
| 8,268,043 B2 | 9/2012 | Celik et al. |
| 8,268,044 B2 | 9/2012 | Wright et al. |
| 8,272,401 B2 | 9/2012 | McLean |
| 8,287,629 B2 | 10/2012 | Fujita et al. |
| 8,319,090 B2 | 11/2012 | Kitamura |
| 8,337,594 B2 | 12/2012 | Corma Canos et al. |
| 8,361,200 B2 | 1/2013 | Sayari et al. |
| 8,361,205 B2 | 1/2013 | Desai et al. |
| 8,377,173 B2 | 2/2013 | Chuang |
| 8,444,750 B2 | 5/2013 | Deckman et al. |
| 8,449,649 B2 | 5/2013 | Greenough |
| 8,470,395 B2 | 6/2013 | Khiavi et al. |
| 8,480,795 B2 | 7/2013 | Siskin et al. |
| 8,512,569 B2 | 8/2013 | Eaton et al. |
| 8,518,356 B2 | 8/2013 | Schaffer et al. |
| 8,529,662 B2 | 9/2013 | Kelley et al. |
| 8,529,663 B2 | 9/2013 | Reyes et al. |
| 8,529,664 B2 | 9/2013 | Deckman et al. |
| 8,529,665 B2 | 9/2013 | Manning et al. |
| 8,535,414 B2 | 9/2013 | Johnson et al. |
| 8,545,602 B2 | 10/2013 | Chance et al. |
| 8,551,444 B2 | 10/2013 | Agnihotri et al. |
| 8,573,124 B2 | 11/2013 | Havran et al. |
| 8,591,627 B2 | 11/2013 | Jain |
| 8,591,634 B2 | 11/2013 | Winchester et al. |
| 8,616,233 B2 | 12/2013 | McLean et al. |
| 8,657,922 B2 | 2/2014 | Yamawaki et al. |
| 8,673,059 B2 | 3/2014 | Leta et al. |
| 8,680,344 B2 | 3/2014 | Weston et al. |

(56) References Cited

U.S. PATENT DOCUMENTS

| | | | |
|---|---|---|---|
| 8,715,617 B2 | 5/2014 | Genkin et al. |
| 8,752,390 B2 | 6/2014 | Wright et al. |
| 8,753,428 B2 | 6/2014 | Lomax, Jr. et al. |
| 8,778,051 B2 | 7/2014 | Weist, Jr. et al. |
| 8,784,533 B2 | 7/2014 | Leta et al. |
| 8,784,534 B2 | 7/2014 | Kamakoti et al. |
| 8,784,535 B2 | 7/2014 | Ravikovitch et al. |
| 8,790,618 B2 | 7/2014 | Adams et al. |
| 8,795,411 B2 | 8/2014 | Hufton et al. |
| 8,808,425 B2 | 8/2014 | Genkin et al. |
| 8,808,426 B2 | 8/2014 | Sundaram |
| 8,814,985 B2 | 8/2014 | Gerds et al. |
| 8,852,322 B2 | 10/2014 | Gupta et al. |
| 8,858,683 B2 | 10/2014 | Deckman |
| 8,875,483 B2 | 11/2014 | Wettstein |
| 8,906,138 B2 | 12/2014 | Rasmussen et al. |
| 8,921,637 B2 | 12/2014 | Sundaram et al. |
| 8,939,014 B2 | 1/2015 | Kamakoti et al. |
| 9,005,561 B2 | 4/2015 | Leta |
| 9,017,457 B2 | 4/2015 | Tammera |
| 9,028,595 B2 | 5/2015 | Sundaram et al. |
| 9,034,078 B2 | 5/2015 | Wanni et al. |
| 9,034,079 B2 | 5/2015 | Deckman et al. |
| 9,050,553 B2 | 6/2015 | Alizadeh-Khiavi et al. |
| 9,067,168 B2 | 6/2015 | Frederick et al. |
| 9,067,169 B2 | 6/2015 | Patel |
| 9,095,809 B2 | 8/2015 | Deckman et al. |
| 9,108,145 B2 | 8/2015 | Kalbassi et al. |
| 9,120,049 B2 | 9/2015 | Sundaram et al. |
| 9,126,138 B2 | 9/2015 | Deckman et al. |
| 9,162,175 B2 | 10/2015 | Sundaram |
| 9,168,483 B2 | 10/2015 | Ravikovitch et al. |
| 9,168,485 B2 | 10/2015 | Deckman et al. |
| 9,272,264 B2 | 3/2016 | Coupland |
| 9,278,338 B2 | 3/2016 | Coupland |
| 9,358,493 B2 | 6/2016 | Tammera et al. |
| 9,573,116 B2 | 2/2017 | Johnson et al. |
| 9,597,655 B2 | 3/2017 | Beeckman |
| 9,737,846 B2 | 8/2017 | Carstensen et al. |
| 9,744,521 B2 | 8/2017 | Brody et al. |
| 10,040,022 B2 | 8/2018 | Fowler et al. |
| 10,080,991 B2 | 9/2018 | Johnson et al. |
| 10,080,992 B2 | 9/2018 | Nagavarapu et al. |
| 10,124,286 B2 | 11/2018 | McMahon et al. |
| 10,322,365 B2 * | 6/2019 | Fowler | B01D 53/0446 |
| 2001/0047824 A1 | 12/2001 | Hill et al. |
| 2002/0053547 A1 | 5/2002 | Schlegel et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0129101 A1 | 7/2003 | Zettel |
| 2003/0131728 A1 | 7/2003 | Kanazirev et al. |
| 2003/0145726 A1 | 8/2003 | Gueret et al. |
| 2003/0170527 A1 | 9/2003 | Finn et al. |
| 2003/0188635 A1 | 10/2003 | Lomax, Jr. et al. |
| 2003/0202918 A1 | 10/2003 | Ashida et al. |
| 2003/0205130 A1 | 11/2003 | Neu et al. |
| 2003/0223856 A1 | 12/2003 | Yuri et al. |
| 2004/0020366 A1 * | 2/2004 | Walker | B01D 53/0446 96/133 |
| 2004/0099142 A1 | 5/2004 | Arquin et al. |
| 2004/0118277 A1 | 6/2004 | Kim |
| 2004/0118747 A1 | 6/2004 | Cutler et al. |
| 2004/0197596 A1 | 10/2004 | Connor et al. |
| 2004/0232622 A1 | 11/2004 | Gozdawa |
| 2005/0045041 A1 | 3/2005 | Hechinger et al. |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0014511 A1 | 7/2005 | Keefer et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0017940 A1 | 1/2006 | Takayama |
| 2006/0048648 A1 | 3/2006 | Gibbs et al. |
| 2006/0049102 A1 | 3/2006 | Miller et al. |
| 2006/0076270 A1 | 4/2006 | Poshusta et al. |
| 2006/0099096 A1 | 5/2006 | Shaffer et al. |
| 2006/0105158 A1 | 5/2006 | Fritz et al. |
| 2006/0116430 A1 | 6/2006 | Wentink et al. |
| 2006/0116460 A1 | 6/2006 | Georget et al. |
| 2006/0162556 A1 | 7/2006 | Ackley et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2007/0084241 A1 | 4/2007 | Kretchmer et al. |
| 2007/0084344 A1 | 4/2007 | Moriya et al. |
| 2007/0222160 A1 | 9/2007 | Roberts-Haritonov et al. |
| 2007/0253872 A1 | 11/2007 | Keefer et al. |
| 2007/0261550 A1 | 11/2007 | Ota |
| 2007/0261557 A1 | 11/2007 | Gadkaree et al. |
| 2007/0283807 A1 | 12/2007 | Whitley |
| 2008/0051279 A1 | 2/2008 | Klett et al. |
| 2008/0072822 A1 | 3/2008 | White |
| 2008/0128655 A1 | 6/2008 | Garg et al. |
| 2008/0202336 A1 | 8/2008 | Hofer et al. |
| 2008/0282883 A1 | 11/2008 | Rarig et al. |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance |
| 2008/0282892 A1 | 11/2008 | Deckman et al. |
| 2008/0289497 A1 | 11/2008 | Barclay et al. |
| 2008/0307966 A1 | 12/2008 | Stinson |
| 2008/0314550 A1 | 12/2008 | Greco |
| 2009/0004073 A1 | 1/2009 | Gleize et al. |
| 2009/0014902 A1 | 1/2009 | Koivunen et al. |
| 2009/0025553 A1 | 1/2009 | Keefer et al. |
| 2009/0025555 A1 | 1/2009 | Lively et al. |
| 2009/0037550 A1 | 2/2009 | Mishra et al. |
| 2009/0071333 A1 | 3/2009 | LaBuda et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0162268 A1 | 6/2009 | Hufton et al. |
| 2009/0180423 A1 | 7/2009 | Kroener |
| 2009/0241771 A1 | 10/2009 | Manning et al. |
| 2009/0284013 A1 | 11/2009 | Anand et al. |
| 2009/0294366 A1 | 12/2009 | Wright et al. |
| 2009/0308248 A1 | 12/2009 | Siskin et al. |
| 2009/0314159 A1 | 12/2009 | Haggerty |
| 2010/0059170 A1 | 3/2010 | McLean |
| 2010/0077920 A1 | 4/2010 | Baksh et al. |
| 2010/0089241 A1 | 4/2010 | Stoner et al. |
| 2010/0186445 A1 | 7/2010 | Minta et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2010/0288704 A1 | 11/2010 | Amsden et al. |
| 2011/0011803 A1 | 1/2011 | Koros |
| 2011/0020202 A1 | 1/2011 | Gadkaree et al. |
| 2011/0031103 A1 | 2/2011 | Deckman et al. |
| 2011/0067440 A1 | 3/2011 | Van Aken |
| 2011/0067770 A1 | 3/2011 | Pederson et al. |
| 2011/0123878 A1 | 5/2011 | Jangbarwala |
| 2011/0146494 A1 | 6/2011 | Desai et al. |
| 2011/0217218 A1 | 9/2011 | Gupta et al. |
| 2011/0277620 A1 | 11/2011 | Havran et al. |
| 2011/0291051 A1 | 12/2011 | Hershkowitz et al. |
| 2011/0296871 A1 | 12/2011 | Van Soest-Vercammen et al. |
| 2011/0308524 A1 | 12/2011 | Brey et al. |
| 2012/0024150 A1 | 2/2012 | Moniot |
| 2012/0024152 A1 | 2/2012 | Yamawaki et al. |
| 2012/0031144 A1 | 2/2012 | Northrop et al. |
| 2012/0067216 A1 | 3/2012 | Corma-Canos et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |

(56) References Cited

U.S. PATENT DOCUMENTS

| | | |
|---|---|---|
| 2012/0255377 A1 | 10/2012 | Kamakoti et al. |
| 2012/0272823 A1 | 11/2012 | Halder et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0095996 A1 | 4/2013 | Buelow et al. |
| 2013/0225898 A1 | 8/2013 | Sundaram et al. |
| 2014/0013955 A1 | 1/2014 | Tammera et al. |
| 2014/0060326 A1 | 3/2014 | Sundaram |
| 2014/0157984 A1 | 6/2014 | Deckman et al. |
| 2014/0157986 A1 | 6/2014 | Ravikovitch et al. |
| 2014/0208797 A1 | 7/2014 | Kelley et al. |
| 2014/0216254 A1 | 8/2014 | Tammera et al. |
| 2015/0013377 A1 | 1/2015 | Oelfke |
| 2015/0068397 A1 | 3/2015 | Boulet et al. |
| 2015/0101483 A1 | 4/2015 | Perry et al. |
| 2015/0196870 A1 | 7/2015 | Albright et al. |
| 2015/0328578 A1 | 11/2015 | Deckman et al. |
| 2016/0023155 A1 | 1/2016 | Ramkumar et al. |
| 2016/0129433 A1 | 5/2016 | Tammera et al. |
| 2016/0166972 A1 | 6/2016 | Owens et al. |
| 2016/0236135 A1 | 8/2016 | Tammera et al. |
| 2016/0332105 A1 | 11/2016 | Tammera et al. |
| 2016/0332106 A1 | 11/2016 | Tammera et al. |
| 2017/0056814 A1 | 3/2017 | Marshall et al. |
| 2017/0113173 A1 | 4/2017 | Fowler et al. |
| 2017/0113175 A1 | 4/2017 | Fowler et al. |
| 2017/0136405 A1 | 5/2017 | Ravikovitch et al. |
| 2017/0266604 A1 | 9/2017 | Tammera et al. |
| 2017/0282114 A1 | 10/2017 | Owens et al. |
| 2017/0341011 A1 | 11/2017 | Nagavarapu et al. |
| 2017/0341012 A1 | 11/2017 | Nagavarapu et al. |
| 2018/0001301 A1 | 1/2018 | Brody et al. |
| 2018/0056229 A1 | 3/2018 | Denton et al. |
| 2018/0056235 A1 | 3/2018 | Wang et al. |
| 2018/0169565 A1 | 6/2018 | Brody et al. |
| 2018/0169617 A1 | 6/2018 | Brody et al. |
| 2018/0339263 A1 | 11/2018 | Dehaas et al. |

FOREIGN PATENT DOCUMENTS

| | | |
|---|---|---|
| EP | 0426937 | 5/1991 |
| EP | 0904827 | 3/1999 |
| EP | 1674555 | 6/2006 |
| EP | 2823872 | 1/2015 |
| FR | 2550466 | 2/1985 |
| FR | 2854819 | 5/2003 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 06006736 | 6/1992 |
| JP | H05-037318 U | 5/1993 |
| JP | 3477280 | 8/1995 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| JP | 2014158997 | 2/2013 |
| KR | 101349424 | 1/2014 |
| RU | 2547115 C2 | 4/2015 |
| WO | WO2002/024309 | 3/2002 |
| WO | WO2002/073728 | 9/2002 |
| WO | WO2005/090793 | 9/2005 |
| WO | WO2010/024643 | 3/2010 |
| WO | WO2011/139894 | 11/2011 |

OTHER PUBLICATIONS

U.S. Appl. No. 16/258,266, filed Jan. 25, 2019, Barnes et al.
U.S. Appl. No. 16/263,940, filed Jan. 31, 2019, Johnson.
U.S. Appl. No. 62/783,766, filed Dec. 21, 2019, Fulton et al.
Allen, M. P. et al., (1987) "Computer Simulation of Liquids" Clarendon Press, pp. 156-160.
Asgari, M. et al., (2014) "Designing A Commercial Scale Pressure Swing Adsorber For Hydrogen Purification" *Petroleum & Coal*, vol. 56(5), pp. 552-561.
Baerlocher, C. et al., (2017) International Zeolite Association's "Database of Zeolite Structures," available at http://www.iza-structure.org/databases/, downloaded Jun. 15, 2018, 1 page.
Burtch, N.C. et al., (2015) "Molecular-level Insight into Unusual Low Pressure $CO_2$ Affinity in Pillared Metal-Organic Frameworks," *J Am Chem Soc*, 135, pp. 7172-7180.
Beauvais, C. et al., (2004) "Distribution of Sodium Cations in Faujasite-Type Zeolite: A Canonical Parallel Tempering Simulation Study," *J Phys Chem B*, 108, pp. 399-404.
Cheung, O. et al., (2013) "Adsorption kinetics for $CO_2$ on highly selective zeolites NaKA and nano-NaKA," *Appl Energ*, 112, pp. 1326-1336.
Cygan, R. T. et al., (2004) "Molecular Models of Hydroxide, Oxyhydroxide, and Clay Phases and the Development of a General Force Field", *J Phys Chem B*, vol. 108, pp. 1255-1266.
Deem, M. W. et al., (2009) "Computational Discovery of New Zeolite-Like Materials", *J Phys Chem C*, 113, pp. 21353-21360.
Demiralp, E., et al., (1999) "Morse Stretch Potential Charge Equilibrium Force Field for Ceramics: Application to the Quartz-Stishovite Phase Transition and to Silica Glass", *Physical Review Letters*, vol. 82(8), pp. 1708-1711.
Dubbeldam, D. et al. (2016) "RASPA: molecular simulation software for adsorption and diffusion in flexible nanoporous materials" *Molecular Simulation*, (published online Feb. 26, 2015), vol. 42(2), pp. 81-101.
Dubbeldam, D., et al., (2013) "On the inner workings of Monte Carlo codes" *Molecular Simulation*, vol. 39, Nos. 14-15, pp. 1253-1292.
Earl, D. J. et al., (2005) "Parallel tempering: Theory, applications, and new perspectives," *Phys Chem Chem Phys*, vol. 7, pp. 3910-3916.
ExxonMobil Research and Engineering and QuestAir (2008) "A New Commercialized Process for Lower Cost H2 Recovery—Rapid Cycle Pressure Swing Adsorption (RCPSA)," *Brochure*, 4 Pgs.
Fang, H. et al., (2013) "First principles derived, transferable force fields for $CO_2$ adsorption in Na-exchanged cationic zeolites," Phys Chem Chem Phys, vol. 15, pp. 12882-12894.
Fang, H., et al., (2012) "Prediction of $CO_2$ Adsorption Properties in Zeolites Using Force Fields Derived from Periodic Dispersion-Corrected DFT Calculations," J Phys Chem C, 10692, 116, ACS Publications.
Farooq, S. et al. (1990) "Continuous Countercurrent Flow Model for a Bulk PSA Separation Process," *AIChE J.*, v36 (2) p. 310-314.
FlowServe (2005) "Exceeding Expectations, US Navy Cuts Maintenance Costs With Flowserve GX-200 Non-Contacting Seal Retrofits," Face-to-Face, v17.1, 8 pgs.
Foster, M.D., et al. "A geometric solution to the largest-free-sphere problem in zeolite frameworks", *Microporous and Mesoporous Materials*, vol. 90, pp. 32-38. date not provided.
Frenkel, D. et al., (2002) "Understanding Molecular Simulation: From Algorithms to Applications", 2nd ed., *Academic Press*, pp. 292-301.
Garcia, E. J., et al. (2014) "Tuning the Adsorption Properties of Zeolites as Adsorbents for $CO_2$ Separation: Best Compromise between the Working Capacity and Selectivity", *Ind. Eng. Chem. Res.*, vol. 53, pp. 9860-9874.
GE Oil & Gas (2007) "Dry Gas Seal Retrofit," Florene, Italy, www.ge.com/oilandgas, 4 pgs.
Harris, J. G. et al., (1995) "Carbon Dioxide's Liquid—Vapor Coexistence Curve and Critical Properties as Predicted by a Simple Molecular Model", *J Phys Chem*, vol. 99, pp. 12021-12024.

(56) References Cited

OTHER PUBLICATIONS

Hill, J. R. et al., (1995) "Molecular Mechanics Potential for Silica and Zeolite Catalysts Based on ab Initio Calculations. 2. Aluminosilicates", *J Phys Chem*, vol. 99, pp. 9536-9550.

Hopper, B. et al. (2008) "World's First 10,000 psi Sour Gas Injection Compressor," *Proceedings of the 37th Turbomachinery Symposium*, pp. 73-95.

Jain, S., et al. (2003) "Heuristic design of pressure swing adsorption: a preliminary study", *Separation and Purification Technology*, vol. 33, pp. 25-43.

Kim J. et al. (2012) "Predicting Large CO2 Adsorption in Aluminosilicate Zeolites for Postcombustion Carbon Dioxide Capture", *J. Am. Chem, Soc.*, vol. 134, pp. 18940-18940.

Kärger, J., et al.(2012) "Diffusion in Nanoporous Materials" , Whiley-VCH publisher, vol. 1, Chapter 16, pp. 483-501.

Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

Lin, L., et al. (2012) "In silico screening of carbon-capture materials", *Nature Materials*, vol. 1, pp. 633-641.

Liu, Q. et al., (2010) "NaKA sorbents with high $CO_2$-over-$N_2$ selectivity and high capacity to adsorb $CO_2$," *Chem Commun,*, vol. 46, pp. 4502-4504.

Lowenstein, W., (1954) "The Distribution of Aluminum in the Tetra-Hedra of Silicates and Aluminates" Am Mineral, 92-96.

Neimark, A. V. et al., (1997) "Calibration of Pore Volume in Adsorption Experiments and Theoretical Models", *Langmuir*, vol. 13, pp. 5148-5160.

Palomino, M., et al. (2009) "New Insights on CO2-Methane Seapration Using LTA Zeolites with Different Si/Al Ratios and a First Comparison with MOFs", Langmar, vol. 26(3), pp. 1910-1917.

Patcas, F.C. et al.(2007) "CO Oxidation Over Structured Carriers: A Comparison of Ceramic Forms, Honeycombs and Beads", *Chem Engineering Science*, v. 62, pp. 3984-3990.

Peng, D. Y., et al., (1976) "A New Two-Constant Equation of State", *Ind Eng Chem Fundam*, vol. 15, pp. 59-64.

Pham, T. D. et al., (2013) "Carbon Dioxide and Nitrogen Adsorption on Cation-Exchanged SSZ-13 Zeolites", *Langmuir*, vol. 29, pp. 832-839.

Pophale, R., et al., (2011) "A database of new zeolite-like materials", *Phys Chem Chem Phys*, vol. 13(27), pp. 12407-12412.

Potoff, J. J. et al., (2001) "Vapor-Liquid Equilibria of Mixtures Containing Alkanes, Carbon Dioxide, and Nitrogen", AIChE J, vol. 47(7), pp. 1676-1682.

Rameshni, Mahin "Strategies for Sour Gas Field Developments," *Worley Parsons-Brochure*, 20 pp. date not provided.

Reyes, S. C. et al. (1997) "Frequency Modulation Methods for Diffusion and Adsorption Measurements in Porous Solids," *J. Phys. Chem. B*. v101, pp. 614-622.

Rezaei, F. et al. (2009) "Optimum Structured Adsorbents for Gas Separation Process", *Chem. Engineering Science*, v. 64, pp. 5182-5191.

Richardson, J.T. et al. (2000) "Properties of Ceramic Foam Catalyst Supports: Pressure Dop", *Applied Catalysis A: General* v. 204, pp. 19-32.

Robinson, D. B., et al., (1985) "The development of the Peng—Robinson Equation and its Application to Phase Equilibrium in a System Containing Methanol," *Fluid Phase Equilibria*, vol. 24, pp. 25-41.

Ruthven, D. M. et al. (1996) "Performance of a Parallel Passage Adsorbent Contactor," *Gas. Sep. Purif.*, vol. 10, No. 1, pp. 63-73.

Stahley, J. S. (2003) "Design, Operation, and Maintenance Considerations for Improved Dry Gas Seal Reliability in Centrifugal Compressors," *Dresser-Rand, Tech. Paper 134*, 15 pages.

Santos, M. S (2011) "New Cycle configuration to enhance performance of kinetic PSA processes" Chemical Engineering Science 66, pp. 1590-1599.

Snurr, R. Q. et al., (1993) "Prediction of Adsorption of Aromatic Hydrocarbons in Silicalite from Grand Canonical Monte Carlo Simulations with Biased Insertions", *J Phys Chem*, vol. 97, pp. 13742-13752.

Stemmet, C.P. et al. (2006) "Solid Foam Packings for Multiphase Reactors: Modelling of Liquid Holdup and Mass Transfer", *Chem. Engineering Research and Design*, v. 84(A12), pp. 1134-1141.

Suzuki, M. (1985) "Continuous-Countercurrent-Flow Approximation for Dynamic Steady State Profile of Pressure Swing Adsorption" *AIChE Symp. Ser*. v81 (242) pp. 67-73.

Talu, O. et al., (2001) "Reference potentials for adsorption of helium, argon, methane, and krypton in high-silica zeolites," *Colloids and Surfaces A: Physicochemical and Engineering Aspects*, vol. 83-93, pp. 83-93.

Walton, K. S. et al., (2006) "CO2 adsorption in Y and X zeolites modified by alkali metal cation exchange," *Microporous and Mesoporous Mat*, vol. 91, pp. 78-84.

Willems, T. F. et al., (2012) "Algorithms and tools for high-throughput geometry-based analysis of crystalline porous materials" *Microporous Mesoporous Mat*, vol. 149, pp. 134-141.

Zukal, A., et al., (2009) "Isosteric heats of adsorption of carbon dioxide on zeolite MCM-22 modified by alkali metal cations", *Adsorption*, vol. 15, pp. 264-270.

\* cited by examiner

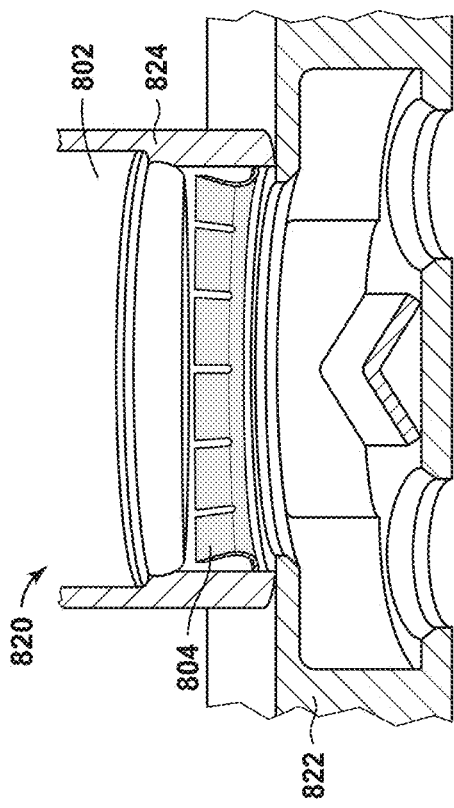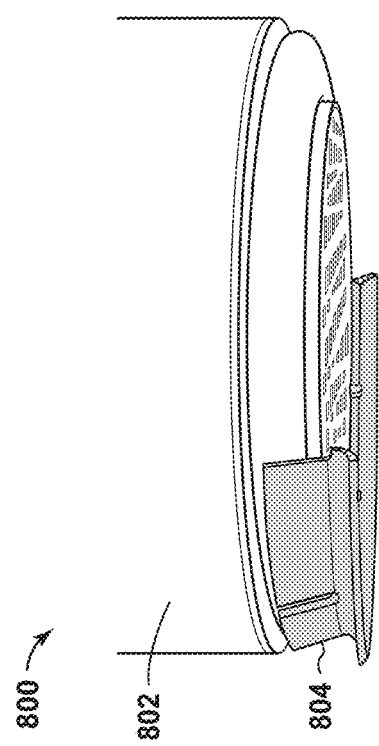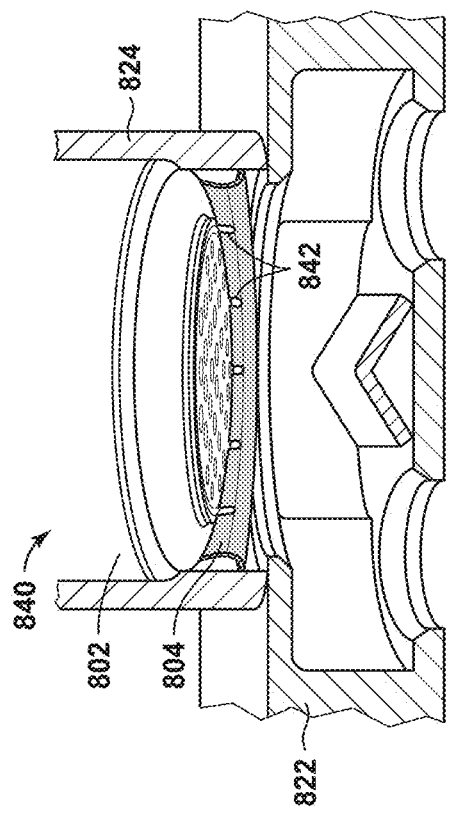

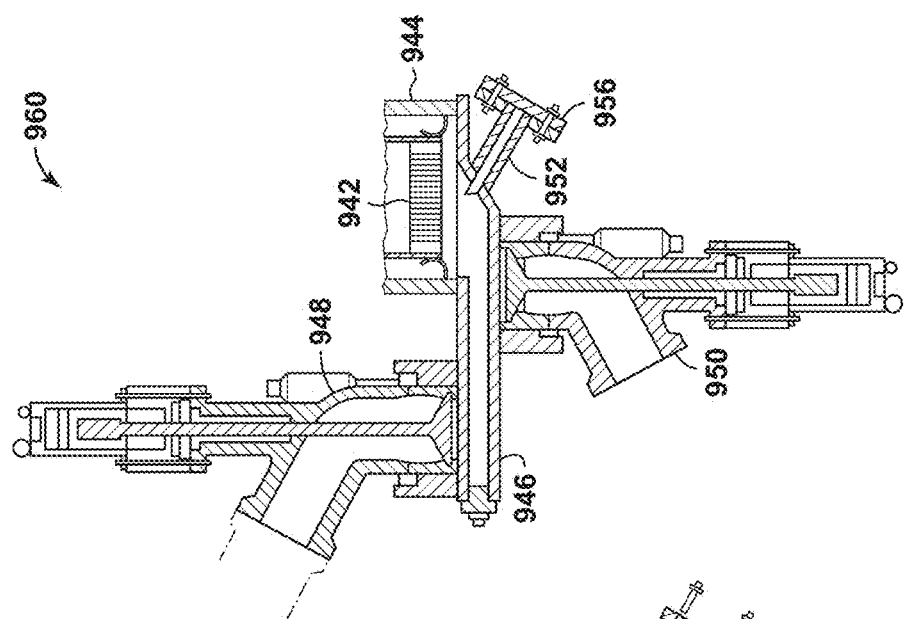
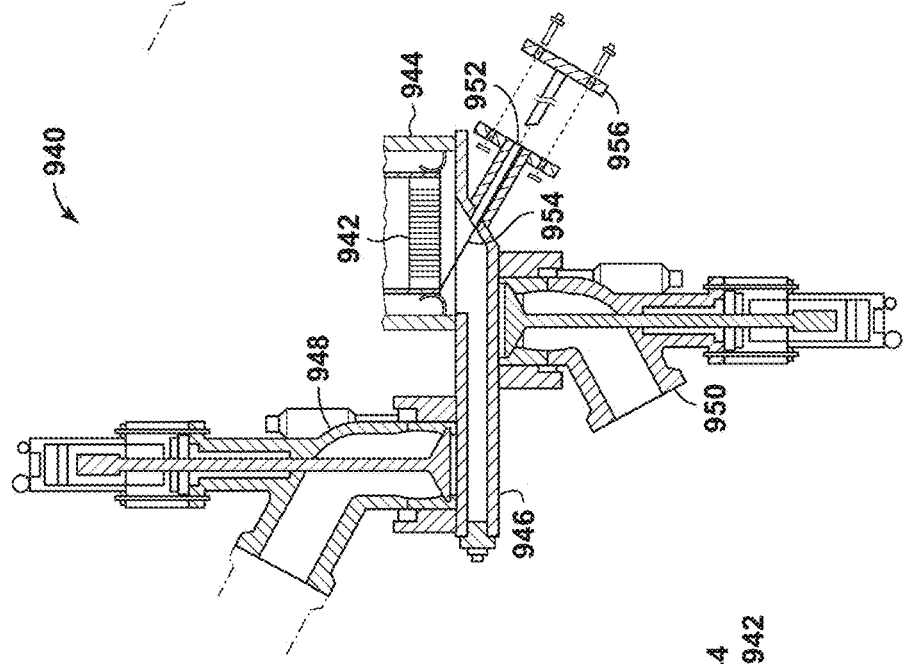
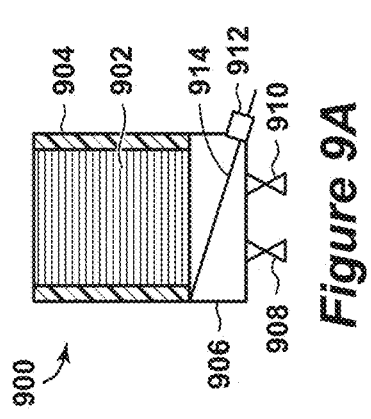
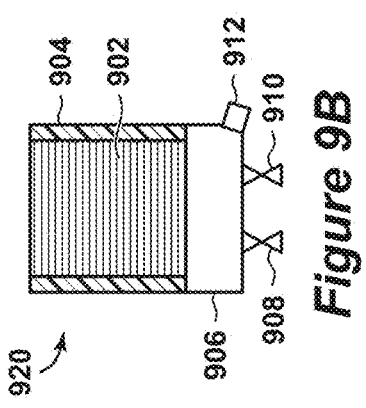
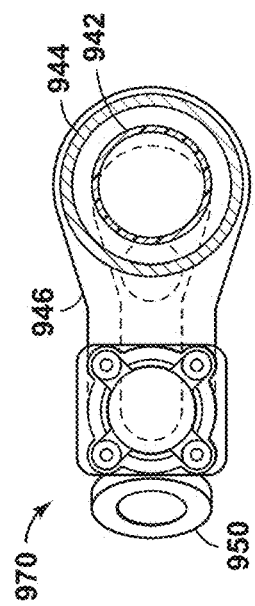

APPARATUS AND SYSTEM FOR SWING ADSORPTION PROCESSES RELATED THERETO

CROSS-REFERENCE TO RELATED APPLICATION

This is a divisional of U.S. patent application Ser. No. 15/450,618, filed Mar. 6, 2017, which claims the benefit of U.S. Provisional Patent Application 62/310,289, filed Mar. 18, 2016, entitled APPARATUS AND SYSTEM FOR SWING ADSORPTION PROCESSES RELATED THERETO, the entirety of which is incorporated by reference herein.

FIELD

The present techniques relate to a system and method associated with an enhanced swing adsorption process. In particular, the system relates to a swing adsorption process for the removing contaminants from a feed stream utilizing adsorbent bed units.

BACKGROUND

Gas separation is useful in many industries and can typically be accomplished by flowing a mixture of gases over an adsorbent material that preferentially adsorbs one or more gas components in a feed stream, while not adsorbing one or more other gas components. The non-adsorbed components are recovered as a separate product. The separation of gas components by adsorption is a conventional technique that is performed in a variety of approaches. For example, adsorptive separations may be based on the differences in equilibrium affinities of the various gas components (e.g., equilibrium separations) or on the differences in adsorption kinetics of the gas components (e.g., kinetics separations).

One particular type of gas separation technology is swing adsorption, such as temperature swing adsorption (TSA), pressure swing adsorption (PSA), partial pressure swing adsorption (PPSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of certain gas components being more readily adsorbed within the pore structure or free volume of an adsorbent material when the gas component is under pressure. That is, the higher the gas pressure, the greater the amount of readily-adsorbed gas adsorbed. When the pressure is reduced, the adsorbed gas component is released, or desorbed from the adsorbent material.

The swing adsorption processes (e.g., PSA and TSA) may be used to separate gas components of a gas mixture because different gas components tend to fill the micropore of the adsorbent material to different extents. For example, if a gas mixture, such as natural gas, is passed under pressure through an adsorbent bed unit, which may referred to as adsorbent bed unit or vessel, containing an adsorbent material that is more selective towards carbon dioxide than it is for methane, at least a portion of the carbon dioxide is selectively adsorbed by the adsorbent material, and the gas exiting the adsorbent bed unit is enriched in methane. When the adsorbent material reaches the end of its capacity to adsorb carbon dioxide, it is regenerated by reducing the pressure, thereby releasing the adsorbed carbon dioxide. The adsorbent material is then typically purged and repressurized. Then, the adsorbent material is ready for another adsorption cycle.

The swing adsorption processes typically involve adsorbent bed units, which include an adsorbent material disposed within the housing of the adsorbent bed unit. These adsorbent bed units utilize different packing material in the adsorbent bed structures. For example, the adsorbent bed units utilize checker brick, pebble beds or other available packing. As an enhancement, some adsorbent bed units may utilize engineered packing within the adsorbent bed structure. The engineered packing may include a material provided in a specific configuration, such as a honeycomb, ceramic forms or the like. The engineered packing may be formed from the adsorbent material or may be a coating on a structure or support.

Further, various adsorbent bed units may be coupled together with conduits, manifolds and valves to manage the flow of fluids. Orchestrating these adsorbent bed units involves coordinating the cycles for each of the adsorbent bed units with other adsorbent bed units in the system. A complete cycle can vary from seconds to minutes as it transfers a plurality of gaseous streams through one or more of the adsorbent bed units.

However, swing adsorption processes present certain challenges because of several demanding technical factors, such as rapid cycle adsorption processes. These factors may include maintaining a low pressure drop through the adsorbent bed, good flow distribution to and within the adsorbent bed and minimal dispersion (e.g., axial spreading) of the concentration front in the adsorbent bed. Also, another factor may include a rapid cycling time that involves fast acting and low dead-volume valves. Finally, another factor may be that an adsorbent bed unit should be configured to contain the adsorbent bed at certain pressures, to support the fast acting valves, and to minimize the dead volume within the adsorbent bed unit.

These challenges are even more complicated for maintenance of the adsorbent bed unit. A conventional rapid cycle adsorbent bed unit is configured as a vertical cylinder with flat endplates (heads) for minimizing dead volume. Flow enters and exits the adsorbent bed unit through fast-acting valves mounted on the flat heads adjacent to the adsorbent material. The location of the valves on the heads results in significant challenges for the replacement of the adsorbent bed. For example, in a conventional adsorbent bed configuration, the valves on one end of the adsorbent bed have to be removed along with any associated manifolds and/or conduits to provide access to the adsorbent bed. The removal of the valves, manifolds and conduits is labor intensive, time consuming and increases the operating costs of the system. As such, the replacement of the adsorbent bed in the unit is problematic.

Accordingly, there remains a need in the industry for apparatus, methods, and systems that provided enhancements to manage the flow of fluids to the adsorbent beds. The present techniques overcome the drawbacks of conventional swing adsorption approaches by providing access through the head to the adsorbent material within the adsorbent bed unit. The present techniques lessen the maintenance outage, lessen labor and cost associated with the maintenance with the adsorbent bed unit as compared to conventional approaches and systems.

SUMMARY OF THE INVENTION

In one embodiment, the present techniques describe a cyclical swing adsorbent bed unit for removing contaminants from a gaseous feed stream. A cyclical swing adsorbent bed unit may be configured to removing contaminants from a gaseous feed stream. The adsorbent bed unit comprising: a housing forming an interior region, the housing including a body portion secured between a first head and a second head; an adsorbent bed disposed within the interior region; and a plurality of first valves secured to the housing, wherein each of the plurality of first valves is configured to control fluid flow along a flow path extending from a location external to the housing through a conduit and to the adsorbent bed, wherein each of the plurality of first valves has a valve cross sectional area disposed outside of an interface cross sectional area of the adsorbent bed.

In yet another embodiment, a process for removing contaminants from a feed stream is described. The process includes: a) performing one or more adsorption steps in an adsorbent bed unit, wherein each of the one or more adsorption steps comprise: (i) opening at least one first poppet valve to pass a gaseous feed stream from a feed inlet conduit to an adsorbent bed disposed in an interior region of a housing of the adsorbent bed unit, wherein the at least one first poppet valve is in direct flow communication with the feed inlet conduit and configured to control fluid flow along a flow path extending from a location external to the housing through the feed inlet conduit and to the adsorbent bed, wherein at least one first poppet valve has a first valve cross sectional area disposed outside of an interface cross sectional area of the adsorbent bed, (ii) exposing the gaseous feed stream to the adsorbent bed to separate one or more contaminants from the gaseous feed stream to form a product stream, and (iii) opening one or more product poppet valves to conduct away the product stream from the interior region in the housing to a product conduit; b) performing one or more purge steps, wherein each of the one or more purge steps comprise passing a purge stream into the adsorbent bed unit to conduct away at least a portion of the one or more contaminants in a purge output stream, wherein the purge output stream is passed through at least one second poppet valve, wherein at least one second poppet valve has a second valve cross sectional area disposed outside of an interface cross sectional area of the adsorbent bed; and c) repeating the steps a) to b) for at least one additional cycle, wherein the cycle duration is for a period greater than 1 second and less than 600 seconds. The process may include interrupting the cycle; removing a head from the adsorbent bed unit near the at least one first poppet valve and the at least one second poppet valve to expose an opening to the interior region; and removing the adsorbent bed from the interior region, wherein the at least one first poppet valve and the at least one second poppet valve are coupled to the adsorbent bed unit. The process may further include disposing a second adsorbent bed into the interior region; securing the head to the adsorbent bed unit; and resuming the cycle for the process. Moreover, the process may include guiding the adsorbent bed unit within the interior region with a thermal expansion ring.

BRIEF DESCRIPTION OF THE FIGURES

The foregoing and other advantages of the present disclosure may become apparent upon reviewing the following detailed description and drawings of non-limiting examples of embodiments.

FIGS. 8A, 8B and 8C are diagrams of a portion of the adsorbent bed unit and the associated thermal expansion ring in accordance with an embodiment of the present techniques.

FIGS. 9A, 9B, 9C, 9D and 9E are diagrams of a catch mechanism in accordance with an embodiment of the present techniques.

DETAILED DESCRIPTION OF THE INVENTION

Figure 1:
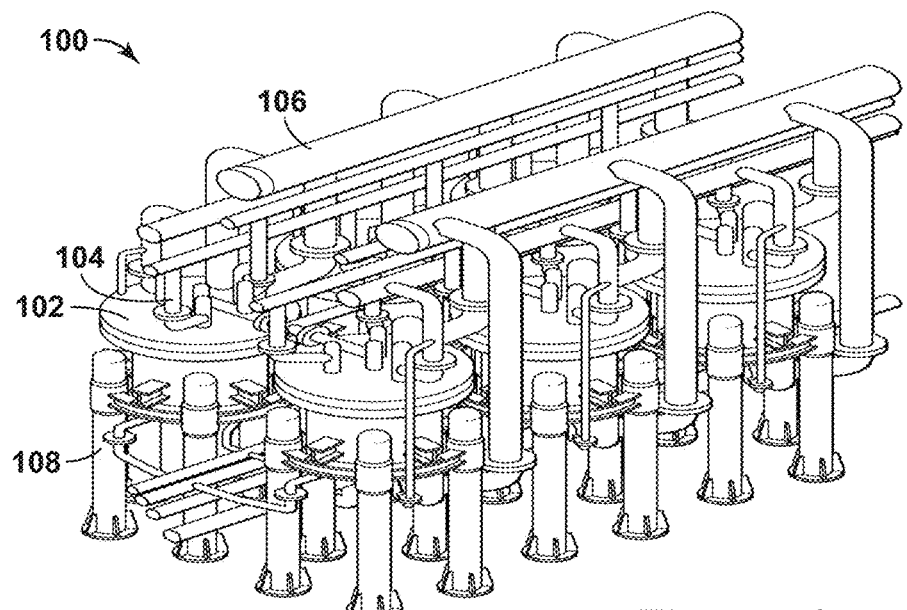
FIG. 1 is a three-dimensional diagram of a swing adsorption system with six conventional adsorbent bed units and interconnecting piping.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

As used herein, "stream" refers to fluid (e.g., solids, liquid and/or gas) being conducted through various equipment. The equipment may include conduits, vessels, manifolds, units or other suitable devices.

As used herein, "conduit" refers to a tubular member forming a channel through which something is conveyed. The conduit may include one or more of a pipe, a manifold, a tube or the like.

The term "in direct flow communication" or "in direct fluid communication" means in direct flow communication without intervening valves or other closure means for obstructing flow. However, the term "in direct flow communication" may include distributors or other distribution mechanisms to distribute the flow along the flow path. As may be appreciated, other variations may also be envisioned within the scope of the present techniques.

The term "interface cross sectional area" means the cross sectional area of an end of the adsorbent bed where the stream enters or exits the adsorbent bed. For example, if a feed stream enters an adsorbent bed at a first end, the cross sectional area of the first end is the interface cross sectional area. As may be appreciated, other variations may also be envisioned within the scope of the present techniques.

The term "valve cross sectional area" means the cross sectional area of a valve relative to an end of the valve where the stream enters or exits the valve. For example, the valve opening may be the valve cross sectional area. In particular, for a poppet valve, a disk element moves to provide a flow passage around the disk element when it is in the open position. Accordingly, the valve opening formed by the disk element's movement away from the valve seat is utilized to determine the valve cross sectional area for the poppet valve, which may be the cross sectional area of the disk element. As may be appreciated, other variations may also be envisioned within the scope of the present techniques.

The term "valve cross sectional area disposed at least partially within the interface cross sectional area" means that the valve cross sectional area is at least partially within the interface cross sectional area when viewed along an axis passing directly through the adsorbent bed along the predominate flow path. For example, the adsorbent bed has an interface at one end where flow enters or exits the adsorbent bed. The interface has a length and a width, while the depth is direction of flow of the stream along the predominate flow path through the adsorbent bed.

The term "valve cross sectional area disposed outside of an interface cross sectional area" means that the valve cross sectional area is outside or extending beyond the interface cross sectional area when viewed along an axis passing directly through the adsorbent bed along the predominate flow path. For example, the adsorbent bed has an interface at one end where flow enters or exits the adsorbent bed. The interface has a length and a width, while the depth is direction of flow of the stream along the predominate flow path through the adsorbent bed.

The term "valve cross sectional area disposed within an interface cross sectional area" means that the valve cross sectional area is within or in the interface cross sectional area when viewed along an axis passing directly through the adsorbent bed along the predominate flow path.

The present techniques relate to a swing adsorption process (e.g., a rapid cycle process) for the removing contaminants from a feed stream (e.g., natural gas) utilizing rapidly cycled adsorbent beds. The present techniques balance the dead volume within the adsorbent bed unit with the maintenance and operability associated with the adsorbent bed unit. In many configurations, the valves are disposed in the adsorbent bed unit's head to lessen the dead volume for swing adsorption processes. However, as the adsorbent material has to be changed on a periodic basis (e.g., once a year, or every two years), the access to the adsorbent material typically involves removing the valves, associated conduits and associated manifolds to provide access to the adsorbent material. The removal of this equipment is labor intensive, introduces failure points to the system and extends the time period for maintenance of the adsorbent bed unit. Accordingly, the present techniques provide an adsorbent bed unit that accommodates the necessary access to the adsorbent material, while managing the dead volume of the adsorbent bed unit in a specific configuration to lessens performance problems from the additional dead volume. In this configuration, the valves for one of the heads have valve cross sectional area disposed outside of or beyond an interface cross sectional area (e.g., cross sectional are defined by an interface to the adsorbent bed).

In contrast to conventional approaches, the present techniques provide access to the adsorbent material to accommodate maintenance on the adsorbent bed unit by having the valves disposed outside of the interface cross sectional area (e.g., outside the head cross sectional area). In conventional configurations, the adsorbent bed has an interface cross section area, which has the valves in direct flow communication with the adsorbent bed disposed directly adjacent to the adsorbent bed and within the interface cross sectional area. In the present techniques, the valves for one of the heads are disposed outside the interface cross sectional area of the adsorbent bed and even outside the head cross sectional area of the adsorbent bed unit. In particular, the valves for one of the heads are disposed outside the outer perimeter of the adsorbent bed unit's head. Accordingly, the present techniques provide access to the adsorbent material through a single head without having to remove other equipment associated with the adsorbent bed unit (e.g., without having to remove valves, conduits or manifolds), which lessens maintenance costs, maintenance time and damage to equipment, managing the dead volume to an acceptable level, and providing an acceptable flow distribution to the adsorbent bed.

In one or more embodiments, the adsorbent bed unit may be a modified vertical cylindrical adsorbent bed unit that is configured to have the flow valves for one head of the adsorbent bed unit not disposed within the interface cross sectional area of the adsorbent bed or even partially within the interface cross sectional area of the adsorbent bed. For example, the flow valves for one head may be disposed on the head of the adsorbent bed unit directly adjacent to the adsorbent bed (e.g., within or partially within the interface cross sectional area), while the flow valves for a second head are configured to be disposed in an outlying location (e.g., disposed outside the interface cross sectional area). This configuration provides maintenance access to the adsorbent bed. The outlying valve mounting locations may be formed integrally with the unit's head, or it may be formed in a separate plate that is located between the units flange and the unit's head. While single valves may be disposed in the different locations, multiple valves may also be used depending on the requirements of the specific application. Also, the valves may be actively-controlled valves and/or passively-controlled valves. A passively-controlled valve may be opened by the differential pressure acting across its moving element (e.g., disk element) without the need to otherwise actuate the moving element.

In certain embodiments, various features may be provided to further enhance the adsorbent bed unit. For example, a thermal expansion ring may be disposed between the adsorbent bed and one of the adsorbent bed unit's heads (e.g., the head having valves disposed within or partially within the interface cross sectional area). The thermal expansion ring may be configured to guide the adsorbent bed, to align the adsorbent bed within the adsorbent bed unit, to adjust for thermal expansion and to guide the adsorbent bed during insertion into the adsorbent bed unit. Further, the adsorbent bed unit may also include a temporary debris foil. The debris foil may be used during maintenance to collect any debris that falls into the adsorbent bed unit during the exchange of the adsorbent materials (e.g., adsorbent bed) and may be disposed between the adsorbent bed and valves near one of the ends (e.g., near one of the heads). For example, if the adsorbent bed is a vertically oriented configuration, the debris foil may be inserted into a deflection port between the lower valves and the adsorbent bed before the adsorbent bed removal begins. Then, any debris may fall to the debris foil and be removed from the adsorbent bed unit. Following insertion of the adsorbent bed unit, the debris foil may be removed and the deflection port may be plugged for operation.

The present techniques may be used to enhance the swing adsorption processes. For example, the cycle for a swing adsorption process may involve two or more steps that each has a certain time interval, which are summed together to be the cycle time. These steps include regeneration of the adsorbent bed following the adsorption step using a variety of methods including pressure swing, vacuum swing, temperature swing, purging (via any suitable type of purge fluid for the process), and combinations thereof. By way of example, a swing adsorption cycle may include the steps of adsorption, depressurization, purging, and re-pressurization. When performing the separation at high pressure, depressurization and re-pressurization (which may be referred to as equalization steps) are performed in multiple steps to reduce the pressure change for each step and enhance efficiency. In some swing adsorption processes, such as rapid cycle swing adsorption processes, a substantial portion of the total cycle time is involved in the regeneration of the adsorbent bed. Accordingly, any reductions in the amount of time for regeneration results in a reduction of the total cycle time. This reduction may also reduce the overall size of the swing adsorption system.

As may be appreciated, the present techniques may also include various pressures for the feed stream and the purge stream. As a result, the adsorbent bed unit may operate in a range of pressures from 5 pounds per square inch absolute (psia) to 1,400 psia. For example, the feed pressure may be based on the preferred adsorption feed pressure, which may be in the range from 400 psia to 1,400 psia, or in the range from 600 psia to 1,200 psia. Also, the purge pressure may be based on the preferred adsorbent purge pressure, which may be in the range from 50 psia to 800 psia, or in the range from 400 psia to 600 psia.

The present techniques may be integrated into a various configurations. For example, the adsorbent bed unit may include structured or unstructured adsorbent beds, and the adsorbent bed unit may also include additional features to facilitate flow straightening and flow distribution. Also, the present techniques may be utilized, but not limited to, dehydration prior to and integrated with a cryogenic Natural Gas Liquid (NGL) recovery, which may involve removing contaminants to cryogenic processing feed gas specifications. Other integrations may include liquefied natural gas (LNG) plant, or other such plants. Regardless, the present techniques may be used to treat feed streams containing excessive amounts of contaminants, such as water and CO2. The present techniques may also be used to remove contaminants to other specifications, such as cryogenic natural gas liquefaction specifications for a cryogenic natural gas liquefaction recovery plant.

In one or more embodiments, the present techniques can be used for any type of swing adsorption process. Non-limiting swing adsorption processes for which the present techniques may include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes, such as pressure/temperature swing adsorption. Exemplary kinetic swing adsorption processes are described in U.S. Patent Application Publication Nos. 2008/0282892, 2008/0282887, 2008/0282886, 2008/0282885, 2008/0282884 and 2014/0013955, which are each herein incorporated by reference in their entirety.

In certain embodiments, the adsorbent bed unit may include a housing, which may include a head portion and other body portions, that forms a substantially gas impermeable partition, an adsorbent bed disposed within the housing and a plurality of valves (e.g., poppet valves) providing fluid flow passages through openings in the housing between the interior region of the housing and locations external to the interior region of the housing. Each of the poppet valves may include a disk element that is seatable within the head or a disk element that is seatable within a separate valve seat inserted within the head. The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifolds or headers.

Adsorptive separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures. In particular, the processes, apparatus, and systems may be used to prepare feed products (e.g., natural gas products) by removing contaminants and heavy hydrocarbons (e.g., hydrocarbons having at least two carbon atoms). The provided processes, apparatus, and systems are useful for preparing gaseous feed streams for use in utilities, including separation applications. The separation applications may include dew point control; sweetening and/or detoxification; corrosion protection and/or control; dehydration; heating value; conditioning; and/or purification. Examples of utilities that utilize one or more separation applications include generation of fuel gas; seal gas; non-potable water; blanket gas; instrument and control gas; refrigerant; inert gas; and/or hydrocarbon recovery.

In other embodiments, the present techniques may be used to lessen contaminants of the stream to a specific level by the swing adsorption process. Accordingly, the present techniques provide additional space for valves, such as poppet valves, by disposing the valves outside of an interface cross sectional area of the adsorbent bed (e.g., the valves have a valve cross sectional area disposed outside of an interface cross sectional area of the adsorbent bed for one of the adsorbent bed unit heads). The present techniques may be further understood with reference to the FIGS. 1 to 8C below.

FIG. 1 is a three-dimensional diagram of a swing adsorption system 100 having six conventional adsorbent bed units and interconnecting piping. While this configuration is a specific example of a conventional skid, this specific configuration is for exemplary purposes as other configurations may include different numbers of adsorbent bed units.

In this system, the adsorbent bed units, such as adsorbent bed unit 102, may be configured for a cyclical swing adsorption process for removing contaminants from feed streams (e.g., fluids, gaseous or liquids). For example, the adsorbent bed unit 102 may include various conduits (e.g., conduit 104) for managing the flow of fluids through, to or from the adsorbent bed within the adsorbent bed unit 102. These conduits from the adsorbent bed units 102 may be coupled to a manifold (e.g., manifold 106) to distribute the flow of the stream to, from or between components. The adsorbent bed within an adsorbent bed unit may separate one or more contaminants from the feed stream to form a product stream. As may be appreciated, the adsorbent bed units may include other conduits to control other fluid steams as part of the process, such as purge streams, depressurizations streams, and the like. Further, the adsorbent bed unit may also include one or more equalization vessels, such as equalization vessel 108, which are dedicated to the adsorbent bed unit and may be dedicated to one or more step in the swing adsorption process.

As an example, which is discussed further below, the adsorbent bed unit 102 may include a housing, which may include a head portion and other body portions, that forms a substantially gas impermeable partition, an adsorbent bed disposed within the housing and a plurality of valves providing fluid flow passages through openings in the housing between the interior region of the housing and locations external to the interior region of the housing. The adsorbent bed may include a solid adsorbent material capable of adsorbing one or more components from the feed stream. Such solid adsorbent materials are selected to be durable against the physical and chemical conditions within the adsorbent bed unit 102 and can include metallic, ceramic, or other materials, depending on the adsorption process. Further examples of adsorbent materials are noted further below.

Figure 2:
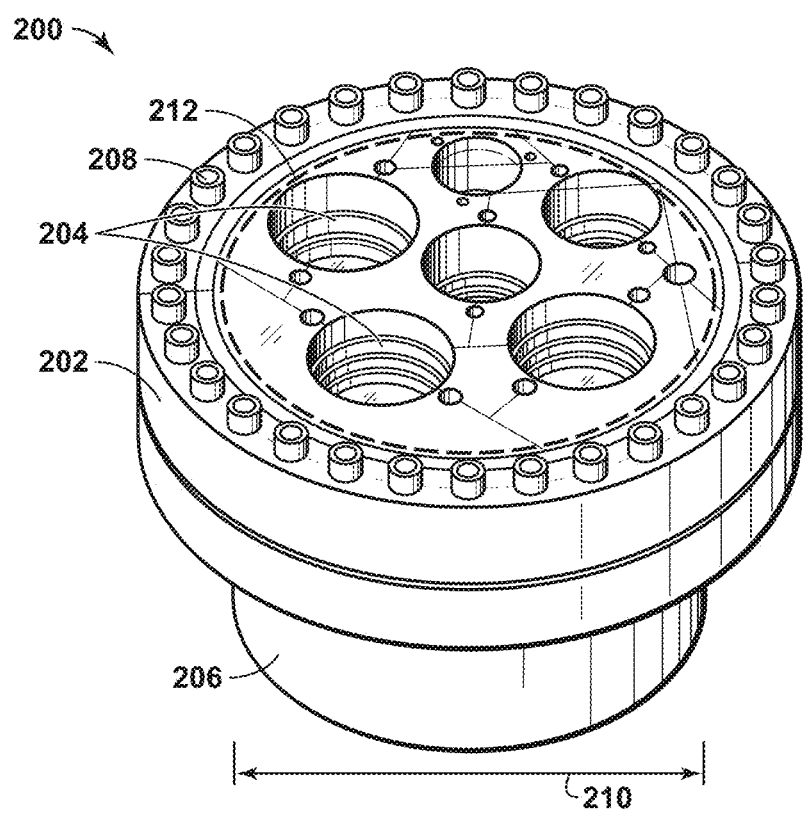
FIG. 2 is a schematic diagram of a partial view of a conventional adsorbent bed unit.

As a specific example, FIG. 2 illustrates a schematic diagram of a partial view of a conventional adsorbent bed unit 200. The adsorbent bed unit 200 includes a flat head 202 with valve bores or valve ports 204. The flat head 202 is connected to a flanged cylindrical unit or body 206 via bolts 208, which is truncated in this partial view. In this diagram, the valves (not shown) are disposed in the valve ports 204. These valve ports are within the interface cross section of the adsorbent bed, which is based on the diameter 210 and the perimeter 212.

As shown in this conventional adsorbent bed unit 200, the valves, which are disposed in the valve ports 204, are positioned directly above the adsorbent bed within the perimeter 212 (e.g., within the interface cross sectional area). However, the removal of the flat head 202 to provide access to the adsorbent material within the adsorbent bed unit 200 involves the removal of the valves, associated conduits and associated manifold to provide access.

For most rapid cycle swing adsorption processes, the dead volume should be minimized By way of example, a dehydration cycle for LNG applications may be considered. In such a process, the cycle may include a feed step that adsorbs contaminants from the feed stream and a regeneration step that removes the contaminants by passing a purge stream through the adsorbent bed, which may be in one or more purge steps. The process inventories for such a process are low and excess dead volume may result in the process operating off specification. This challenge is particularly detrimental in processes that involve a temperature swing as part of the process, where the heating fluid temperature is lessened due to heat loss in the excessive dead volume.

Further, the excess dead volume may be more problematic on one end of the process. For example, the excess dead volume on the product side or product end may be more detrimental than excess dead volume on the feed side or feed end. This is a result of the excessive dead volume on the product end having cooler gas within that excess dead volume prior to the start of the purge step. Once purge commences, the hot purge gas in the purge stream mixes with the cool gas in the excess dead volume, which results in the purge gas being cooled as it is passed to the adsorbent bed. Unfortunately, the cooler purge stream does not regenerate the adsorbent bed as efficiently as a hotter purge stream. Moreover, the additional header volume may increase the surface area and thermal mass in which the hot purge gas is in contact. This results in an increase in heat loss from the purge gas to the surroundings (e.g., region within the adsorbent bed unit upstream of the adsorbent bed), which also lessens the adsorbent bed's regeneration efficiency.

Figure 3:
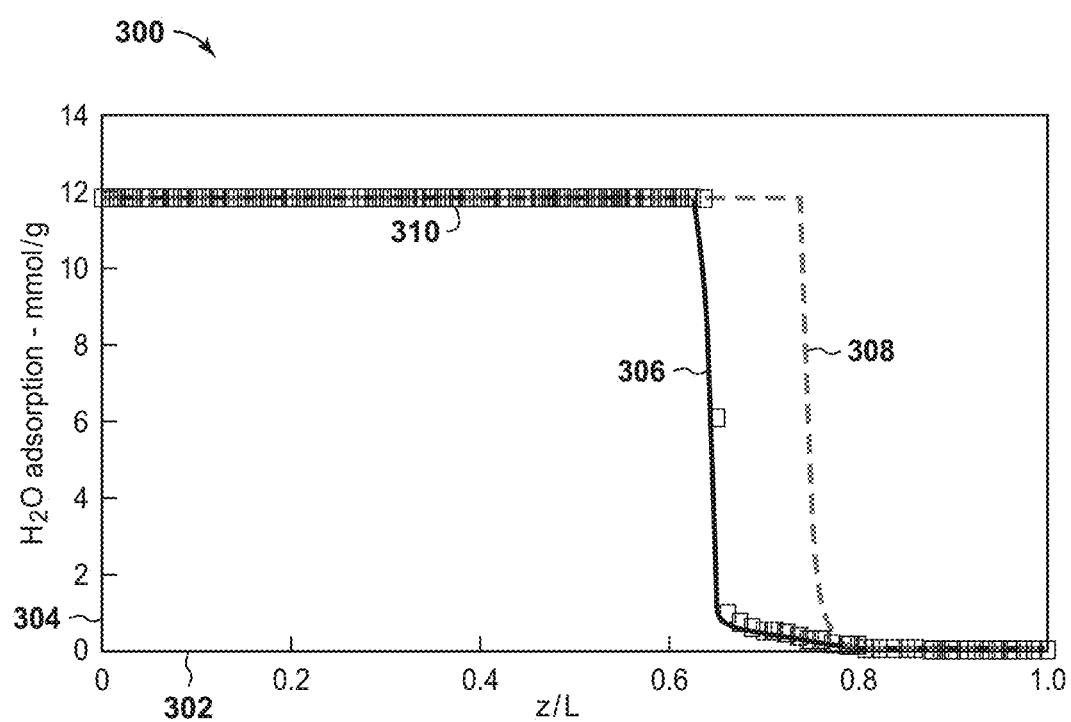
FIG. 3 is a chart of the differences in the detrimental effect of excess dead volume at the respective ends of the adsorbent bed.

The detrimental effect of excess dead volume at the respective ends of the adsorbent bed are described in FIG. 3. FIG. 3 is a chart 300 of the differences in the detrimental effect of excess dead volume at the respective ends of the adsorbent bed. The chart 300 includes responses 306, 308 and 310, which are modeled values of the H2O adsorption in millimoles per gram (mmol/g) along the adsorption axis 304 relative to the normalized length of the adsorbent bed (z/L) along the length axis 302. In this chart 300, the effect of heat transfer between purge gas and metal surface of excess dead volume is shown through the various responses 306, 308 and 310. The response 306 is a modeled response (e.g., solid line) where the dead volume is minimized to 1.6 L, the response 308 is a modeled response (e.g., dashed line) where the dead volume is increased to 19.2 L and both the above effects are considered, and the response 310 is a modeled response (e.g., squares) where the dead volume is increased but only the first effect above is considered. As shown in this chart 300, the primary problem with increasing dead volume on the product side is the increased heat loss to the surroundings, which results in a lower regeneration temperature. As such, if additional dead volume is required, steps should be taken to decrease heat transfer between purge gas and any metal it comes in contact with.

As noted above, the conventional configuration of the adsorbent bed unit, as shown in FIG. 2, may involve disposing the valves within the valve cross sectional area disposed at least partially within the interface cross sectional area. For example, the adsorbent bed may be installed inside a vertical cylinder with flanged flat heads on either end. Poppet valves may be used to facilitate flow between the adsorbent bed and external locations and may be installed directly on top of the flat heads, which minimizes dead volume for the adsorbent bed unit. The mixing zone is the region between the adsorbent bed and the valve at the respective ends of the adsorbent bed unit. During normal operation, the feed stream is introduced through one of the valves on the upper head and removed as a treated product through one of the valves on the lower head. Similarly, during a regeneration step, a purge stream is introduced through one of the valves on the lower head and removed from one of the valves on the upper head. Depending upon the specific process, other streams may be introduced into the adsorbent bed unit. Further, more than one valve may be used for a single service or a single valve may be used for multiple services.

By way of example, for such a configuration above, only four services may be considered for the process. Accordingly, the configuration may include a feed inlet and purge outlet on the top flat head and a product outlet and purge inlet on the bottom flat head. Each service may use a single valve, but other configurations may include dual service valves. It should also be noted that the valves may be the actively-controlled valves and/or passively-controlled valves. In this configuration, the regions between the poppet valves and the adsorbent bed are the dead volumes. These dead volumes are a mixing zone, where fluid streams from the two services on either side of the vessel mix and there is heat transfer to surrounding metal. As may be appreciated, for efficient process operation, the mixing zone is preferably minimized. However, due to this configuration, the access to the adsorbent material, such as the adsorbent bed, becomes challenging as the whole valve assembly has to be removed. This removal may be labor intensive and shorten the lifecycle of the equipment, as the removal of valve assembly may include removing various hydraulic connections (e.g., three to seven for each valve assembly).

Figure 4A:
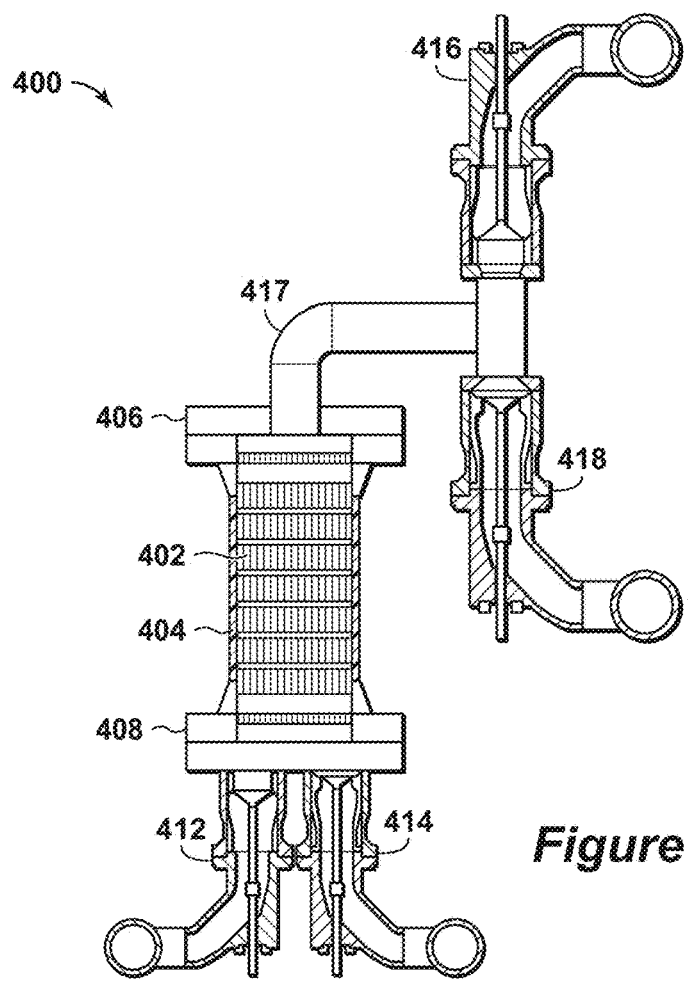
FIGS. 4A and 4B are diagrams of a portion of an adsorbent bed unit having associated valve assemblies in accordance with alternative embodiments of the present techniques.
Figure 4B:
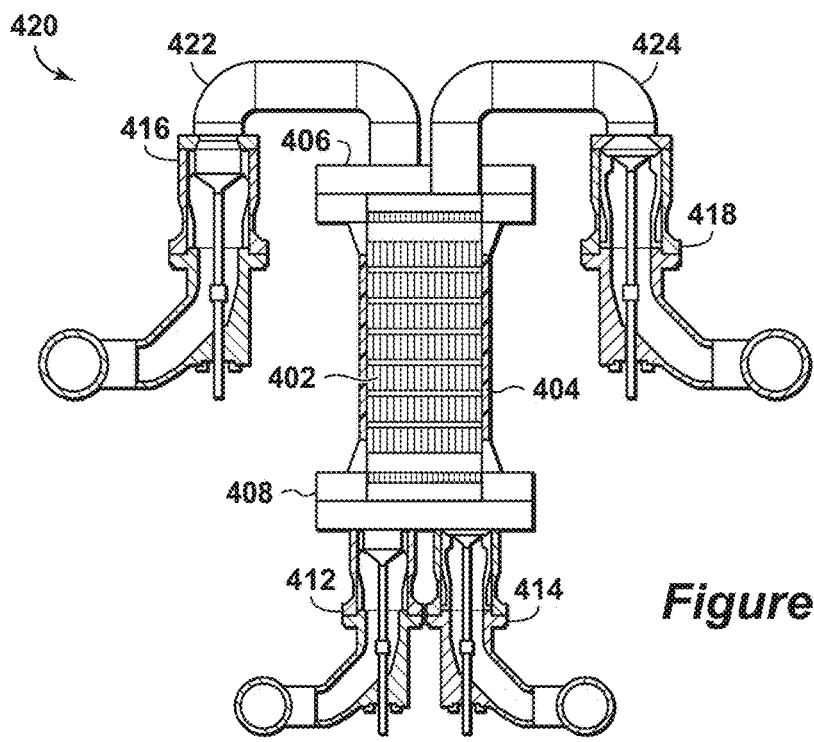

The present techniques provide embodiments to overcome the limitations on the access to the adsorbent material within the adsorbent bed unit. For example, FIGS. 4A and 4B are diagrams 400 and 420 of a portion of an adsorbent bed unit having associated valve assemblies in accordance with alternative embodiments of the present techniques. For each of the diagrams 400 and 420, the portion of the adsorbent bed units, which may be used in a multi-adsorbent bed configuration similar to FIG. 1, includes a body or housing, which may include an adsorbent bed 402 disposed within a cylindrical wall and cylindrical insulation layer 404 along with an upper head 406 and a lower head 408.

The upper head 406 and lower head 408 may have different configurations, such that one of the heads 406 or 408 may provide access to the adsorbent bed 402. The adsorbent bed unit is coupled to different manifolds (not shown) to provide and conduct away fluids to the adsorbent bed. In the diagrams 400 and 420, the upper head 406 do not include any valves, while the lower head 408 contains valve assemblies, such as valve assemblies 412 and 414, respectively (e.g., poppet valves). For the upper region of the adsorbent bed, fluids flow into or out of the upper open flow path volume between the head 406 and the adsorbent bed 402 via valves structures, such as valves 416 and 418, which are connected via different conduit configurations. These conduit configurations are discussed further below in the respective diagrams 400 and 420. The upper or lower open flow path volume between the respective head 406 or 408 and adsorbent bed 402 can also contain flow distributors (not shown) which directly introduce fluids into the adsorbent bed 402 in a uniform manner. The flow distributor may include a perforated plate, circular plate or other device that distributes the flow over the adsorbent bed.

If the valve assemblies 412, 414, 416 to 418 are poppet valves, each may include a disk element connected to a stem element which can be positioned within a bushing or valve guide. The stem element may be connected to an actuating means, such as actuating means (not shown), which is configured to have the respective valve impart linear motion to the respective stem. As may be appreciated, the actuating means may be operated independently for different steps in the process to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets.

In this configuration, the interface is the ends of the adsorbent bed 402 adjacent to the heads 406 and 408. The interface cross sectional area is the cross sectional area of the adsorbent bed 402 at the respective ends near heads 406 and 408. For this configuration, the valves 412 and 414 are disposed within or partially within the interface cross sectional area, while the valves 416 and 418 are disposed outside of or beyond the interface cross sectional area, which is defined by the adsorbent bed 402. In addition, the valve cross sectional area for the valves is defined by the shape of the valve adjacent to the adsorbent bed 402 (or nearest face toward the bed for the valves outside the interface cross sectional area), while the interface cross sectional area is defined by the shape of the adsorbent bed 402. In this configuration, the valves 412 and 414 are in direct flow communication with a conduit and configured to control fluid flow along a flow path extending from a location external to the housing through the conduit and to the adsorbent bed 402, wherein the valves 412 and 414 have a valve cross sectional area disposed at least partially within the interface cross sectional area of the adsorbent bed 402, while the valves 416 and 418 have a valve cross sectional area outside of an interface cross sectional area of the adsorbent bed 402.

As noted above, the valves 416 and 418 are outside the perimeter of the head (e.g., have valve cross sectional areas outside of the interface cross sectional area of the adsorbent bed 402). In the diagrams 400 and 420, different configurations are presented with different flow paths for the fluids passing to and conducted away from the adsorbent bed 402. For diagram 400, the valves 416 and 418 provide a flow path through the conduit 417, which is shared between the valves. The flow of the fluids from these valves 416 and 418 has to be diverted to follow the predominate flow path through the adsorbent bed. In this configuration, the conduit 417 is a 90 degree elbow connected to the head 406 (e.g., top flat head). On the other end of this elbow, the two valves 416 and 418 are installed. The conduit may be flanged such that removing these flanges can easily provide access to the head 406 and the adsorbent bed 402, without having to remove the valve assembly of valves 416 and 418. In this configuration, the conduit 417 alternately is exposed to warm and cold gas streams flowing through the conduit 417 to the respective valves 416 and 418. As a result, a large heat transfer loss may be present in this configuration.

For diagram 420, the valves 416 and 418 provide a flow path through the conduits 422 and 424, respectively. These conduits 422 and 424 provide a curved flow path from a direction substantially opposite the predominate flow path. As such, the flow of the fluids from these valves 416 and 418 has to be diverted to follow the predominate flow path through the adsorbent bed 402. These conduits 422 and 424 are curved into U-bends that are connected to the head 406, with each valve 416 and 418 installed on the other end of these U-bends. The U-bends may be flanged such that removing these flanges can easily provide access to the head 406 and the adsorbent bed 402, without having to remove the respective valves 416 and 418. In this configuration, each conduit 422 and 424 remains at nearly the same temperature throughout the process, as it is exposed to a moving fluid of nearly constant temperature. For example, when the product valve is open, cold gas flow through the conduit connecting to this valve and the other conduit operates nearly as a dead-leg. Similarly, when the purge inlet valve is open, the hot purge gas flow through the conduit connecting to this valve and the other conduit operates nearly as a dead-leg. As such, the heat loss from the purge gas stream is minimal. The mixing zone is also largely restricted to the narrow region between the head 406 and the adsorbent bed 402. While a small amount of mixing may occur in the conduits 422 and 424, it is not expected to be detrimental to the performance.

As a further enhancement, additional refinements to the configuration of the adsorbent bed unit may be implemented. For example, the adsorbent bed unit may be orientated in the vertical axial plane having fixed conduits integral to the housing that are further attached to a series of fast acting process stream valves. The valves may be coupled to a series of process supply and product headers. The upper most limit of the adsorbent bed unit may terminate in a bolt-on cover (e.g., head) used for accessing the adsorbent bed unit's internals, such as the adsorbent bed, and mechanically supports an integral shaped flow vane or flow diverter. Further, the flow vane may be aligned to the process stream valves, which provides a mechanism of distributing the gaseous stream path to and from the adsorbent bed. In addition, the lower most limit of the adsorbent bed unit may terminate in a manifold that further attaches a series of fast acting process stream valves. The lower most manifold supports a similar flow vane having a similar purpose to the upper region.

The adsorbent bed unit includes an adsorbent bed, which may have a cross-sectional geometry of a circular, a square, a rectangular or other polynomial in shape, which is axially aligned to the adsorbent bed unit's vertical axis. The adsorbent bed may be housed in a monolithic metallic shell or liner having integral flow distribution hardware located on both of the adsorbent beds terminating ends. The adsorbent bed may be concentrically supported and aligned with the upper adsorbent bed termination by a plurality of fasteners. The supporting contact surface may be integral to a concentric seal ring, which prevents a by-pass gas stream from traveling other than through the adsorbent bed. The lower adsorbent bed may terminate to be concentrically aligned with a series of equally spaced metallic prongs that permit thermal bed expansion in either axial direction (e.g., with a thermal expansion ring). The prongs may limit the adsorbent beds movement in the horizontal plane.

Further, the present techniques may provide flexible process valve configurations. For example, the present techniques may include alternate process valve locations, such as upper most limit valves may be arranged at any desired angle around the housing perimeter. Also, the valve placement may be utilized to enhance process stream flow alignment to the adsorbent bed when opposing valves are not desirable. The present techniques further provides alternate process valve placement, such as lower most limit valves that may be arranged at any desired vertical orientation to suit a desired dead volume criteria.

Moreover, the present techniques may be utilized to enhance turnaround and adsorbent bed unit maintainability. For example, the present techniques provide a simple method of accessing, removing and replacing the internal adsorbent bed without complex or mechanized apparatuses. Once the primary support is un-bolted the adsorbent bed assembly is lifted from the adsorbent bed unit in a vertical plane. The replacement adsorbent bed assembly is installed in the reverse order. In addition, the process stream valves located directly below the adsorbent bed may be protected with a catch mechanism (e.g., a temporary debris foil). The debris foil may be installed through a removable cover plate. The protective debris foil may lessen or avoid blinding the valve with foreign debris during the unit turnaround and maintenance operations. Further, as another benefit, the removal and replacement of the adsorbent bed assembly without the need to disassembly the process conduits, and associated process valves and their hydraulic utility service systems lessens maintenance operations and costs.

Further still, the present techniques provide various cost saving incentives as compared to conventional adsorbent bed units. For example, a conventional adsorbent bed unit with similar services having vessel closures, which terminate with custom fabricated raised face weld neck flanges, locates all process valves onto a flat closure cover that is significantly thick to overcome a vertical deflection due to impart by the valves dynamic loads and minimal material ligament between each process valve. In comparison, the present techniques may utilize a simple closure cover plate having a minimal material thickness in the proposed configurations. Accordingly, to service the adsorbent bed of the conventional adsorbent bed unit, the closure cover and all process valves and adjoining conduits have to be removed to gain internal access. Yet, the present techniques do not required a mandatory disassembly of the process stream valves or adjoining conduits when gaining access to the adsorbent bed unit's internals. Further, the conventional adsorbent bed unit may also require a complex arrangement of conduits to and from all process stream valves that integrate into large diameter process piping. In comparison, the present techniques employ a simple compact pipe arrangement. The combined savings in material volume and compact pipe-run configuration, which is outlined in the fore mentioned is a direct dollar savings associated to the; initial fabrication, future maintenance and long range unit operability costs.

The present techniques provide embodiments to overcome the limitations on the access to the adsorbent material within the adsorbent bed unit. For example, FIGS. 5A, 5B, 5C and 5D are additional diagrams 500, 520, 540 and 560 of a portion of an adsorbent bed unit having associated valve assemblies in accordance with alternative embodiments of the present techniques. For each of the diagrams 500, 520, 540 and 560, the portion of the adsorbent bed units, which may be used in a configuration similar to FIG. 1, includes a body or housing, which may include a cylindrical wall 502 and cylindrical insulation layer 504 along with an upper head 506 and a lower head 508. An adsorbent bed 510 is disposed between an upper head 506 and a lower head 508 and the insulation layer 504, resulting in an upper open zone, and lower open zone, which are comprised substantially of open flow path volume. The open flow path volume in adsorbent bed unit contains gas that has to be managed for the various steps. The housing may be configured to maintain a pressure between 0.1 bara and 100 bara within the interior region, for example.

The upper head 506 and lower head 508 may have different configurations, such that one of the heads 506 or 508 may provide access to the adsorbent bed 510. The adsorbent bed unit is coupled to different manifolds (not shown) to provide and conduct away fluids to the adsorbent bed. In the diagrams 500, 520, 540 and 560, the upper head 506 do not include any valves, while the lower head 508 contains openings in which valve structures can be inserted, such as valve assemblies 512 and 514, respectively (e.g., poppet valves). For the upper region of the adsorbent bed, fluids flow into or out of the upper open flow path volume between the head 506 and the adsorbent bed 510 via valves structures, such as valves 516 and 518, which are connected via different conduit configurations. These conduit configurations are discussed further below in the respective diagrams 500, 520, 540 and 560. The upper or lower open flow path volume between the respective head 506 or 508 and adsorbent bed 510 can also contain flow distributors (not shown) which directly introduce fluids into the adsorbent bed 510 in a uniform manner. The flow distributor may include a perforated plate, circular plate or other device that distributes the flow over the adsorbent bed.

If the valve assemblies 512, 514, 516 to 518 are poppet valves, each may include a disk element connected to a stem element which can be positioned within a bushing or valve guide. The stem element may be connected to an actuating means, such as actuating means (not shown), which is configured to have the respective valve impart linear motion to the respective stem. As may be appreciated, the actuating means may be operated independently for different steps in the process to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets.

In this configuration, the interface is the ends of the adsorbent bed 510 adjacent to the heads 506 and 508. The interface cross sectional area is the cross sectional area of the adsorbent bed 510 at the respective ends near heads 506 and 508. For this configuration, the valves 512 and 514 are disposed within or partially within the interface cross sectional area, while the valves 516 and 518 are disposed outside of or beyond the interface cross sectional area, which is defined by the adsorbent bed 510. In addition, the valve cross sectional area for the valves is defined by the shape of the valve adjacent to the adsorbent bed 510 (or nearest face toward the bed for the valves outside the interface cross sectional area), while the interface cross sectional area is defined by the shape of the adsorbent bed 510. As an example in diagram 500, if the valve 512 is a poppet valve having a circular disk element and the adsorbent bed 510 has the shape of a circular prism, the valve cross sectional area for the valve 512 is the area of the circle having a diameter 505, while the interface cross sectional area for the adsorbent bed 510 is the area of the circle having a diameter 507. Similarly, if the valve 516 is a poppet valve having a circular disk element, the valve cross sectional area for the valve 516 is the area of the circle having a diameter 509. In this configuration, the valves 512 and 516 are in direct flow communication with a conduit and configured to control fluid flow along a flow path extending from a location external to the housing through the conduit and to the adsorbent bed 510, wherein the valve 512 has a valve cross sectional area disposed within the interface cross sectional area of the adsorbent bed 510 and the valve 516 has a valve cross sectional area outside of an interface cross sectional area of the adsorbent bed 510. In other configurations, the valves 512 and 514 may have valve cross sectional areas disposed at least partially within the interface cross sectional area of the adsorbent bed 510.

As noted above, the valves 516 and 518 are outside the perimeter of the head (e.g., have valve cross sectional areas outside of the interface cross sectional area of the adsorbent bed 510). In the diagrams 500, 520, 540 and 560, different configurations are presented with different flow paths for the fluids passing to and conducted away from the adsorbent bed 510. For diagram 500, the valves 516 and 518 provide a flow path through the conduits 517 and 519, respectively. The flow of the fluids from these valves 516 and 518 has to be diverted to follow the predominate flow path through the adsorbent bed. For diagram 520, the valves 516 and 518 provide a flow path through the conduits 522 and 524, respectively. These conduits 522 and 524 provide a curved flow path from a direction substantially opposite the predominate flow path. As such, the flow of the fluids from these valves 516 and 518 has to be diverted to follow the predominate flow path through the adsorbent bed 510. For diagram 540, the valves 516 and 518 provide a flow path through the conduits 542 and 544, respectively. These conduits 542 and 544 provide an angled flow path from a direction substantially concurrent with the predominate flow path. As such, the flow of the fluids from these valves 516 and 518 may experience less pressure drop, while has to be diverted to follow the predominate flow path through the adsorbent bed 510. For diagram 560, the valves 516 and 518 provide a flow path through the conduits 562 and 564, respectively. These conduits 562 and 564 provide a curved flow path from a direction substantially concurrent with the predominate flow path. As such, the flow of the fluids from these valves 516 and 518 may experience less pressure drop, while has to be diverted to follow the predominate flow path through the adsorbent bed 510.

Figure 6A:
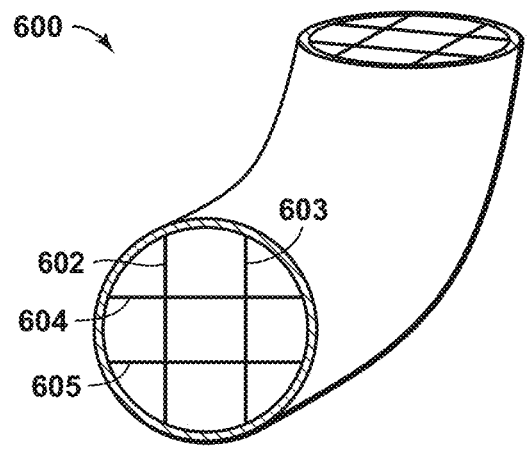
FIGS. 6A, 6B, 6C, 6D and 6E provide a conduit with various structure elements in accordance with an embodiment of the present techniques.
Figure 6B:
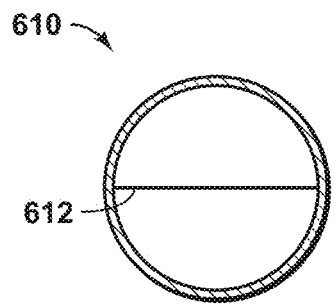
Figure 6C:
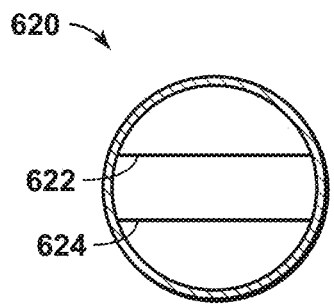
Figure 6D:
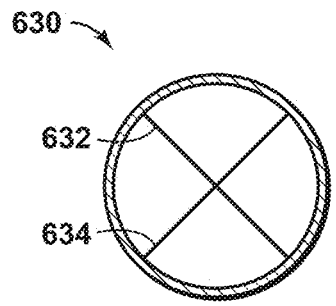
Figure 6E:
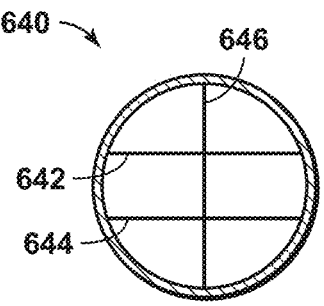

To further enhance the configuration, structural elements may be used in the passage from the valve to provide near plug flow in the conduit or housing passage for the valve. This may reduce the amount of mixing and the corresponding heat losses to some extent. These configurations may include angled flow paths to manage the temperature front as streams move in and out of the adsorbent beds. Accordingly, the angle and bend within the conduit or housing for the flow into the adsorbent bed should maintain the near plug flow regime through the bend. Accordingly, the conduit or housing that forms the bend may include various structural elements to provide plug flow balancing pressure drop and thermal mass participating in heat exchange. For example, FIGS. 6A, 6B, 6C, 6D and 6E provide a conduit with various structure elements in accordance with an embodiment of the present techniques. In FIG. 6A, a diagram 600 of a conduit is shown with structural elements 602, 603, 604 and 605, which are used to divide the internal passage into nine separate passages. Further, FIG. 6B provides a diagram 610 of a cross section for a single structural element 612 dividing the passage into two separate passages. FIG. 6C provides a diagram 620 of a cross section for two substantially parallel structural elements 622 and 624 dividing the passage into three separate passages. FIG. 6D provides a diagram 630 of a cross section for two crossing structural elements 632 and 634 (e.g., perpendicular to each other) dividing the passage into four separate passages. FIG. 6E provides a diagram 640 of a cross section for two parallel structural elements 642 and 644 and one perpendicular structural element 646 relative to the two parallel structural elements configured to divide the passage into six separate passages.

In addition, for areas outside the adsorbent bed, additional filler elements or structures may be used to lessen the dead volume. The filler structures may include filler material, channels and/or baffles, which may be utilized to manage the flow path and lessen the dead volume within the adsorbent bed unit. Also, the valves, such as valve assemblies, may be configured to operate (e.g., open or close) via a common actuation mechanism, such as a lift plate or other actuation mechanism, for different streams.

Beneficially, the present techniques provide various enhancements. One enhancement is the ability to change the adsorbent bed without removal of valves, conduits or manifolds. Another enhancement is limiting dead volume to an acceptable level to achieve acceptable cycle performance. Yet another enhancement is maintaining an acceptable flow distribution to the adsorbent bed inlet.

Beneficially, the present techniques provide various enhancements. One enhancement is the ability to change the adsorbent bed without removal of valves, conduits or manifolds. Another enhancement is limiting dead volume to an acceptable level to achieve acceptable cycle performance. Yet another enhancement is maintaining an acceptable flow distribution to the adsorbent bed inlet.

FIGS. 7A, 7B, 7C, 7D, 7E and 7F are diagrams 700, 720, 740, 750, 760 and 770 of an exemplary adsorbent bed unit in accordance with an embodiment of the present techniques. These diagrams 700, 700, 720, 740, 750, 760 and 770 are an embodiment of the adsorbent bed unit in diagram 560 of FIG. 5D. In the diagrams 700, 700, 720, 740, 750, 760 and 770, the housing 702 is shown with the valve openings 704, 706, 708 and 710, the upper head 712 and the lower head 714. The valve openings 708 and 710 provide a flow path into the interior region of the housing along respective curved body portions 709 and 711, which may be a separate conduit or fabricated portion of the housing). Further, the structural element 716 may be utilized to support and stabilize the adsorbent bed unit during operation. In this configuration, the valve openings 704 and 706 are disposed within the perimeter of the head 714, such that any valve installed into the valve openings 704 and 706 have a valve cross sectional area disposed at least partially within of an interface cross sectional area. The valve openings 708 and 710 are disposed outside of the perimeter of the head 712, such that the any valve installed into the valve openings 708 and 710 have a valve cross sectional area disposed outside of an interface cross sectional area.

Figure 7B:
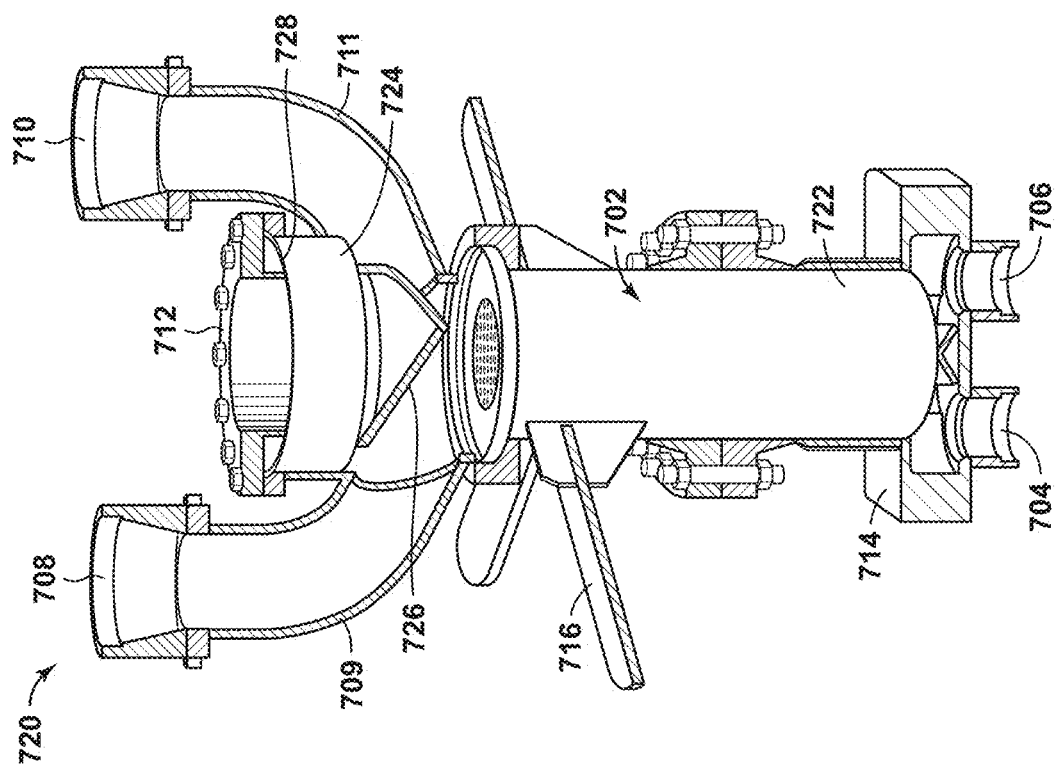
FIGS. 7A, 7B, 7C, 7D, 7E and 7F are diagrams of an exemplary adsorbent bed unit in accordance with an embodiment of the present techniques.
Figure 7A:
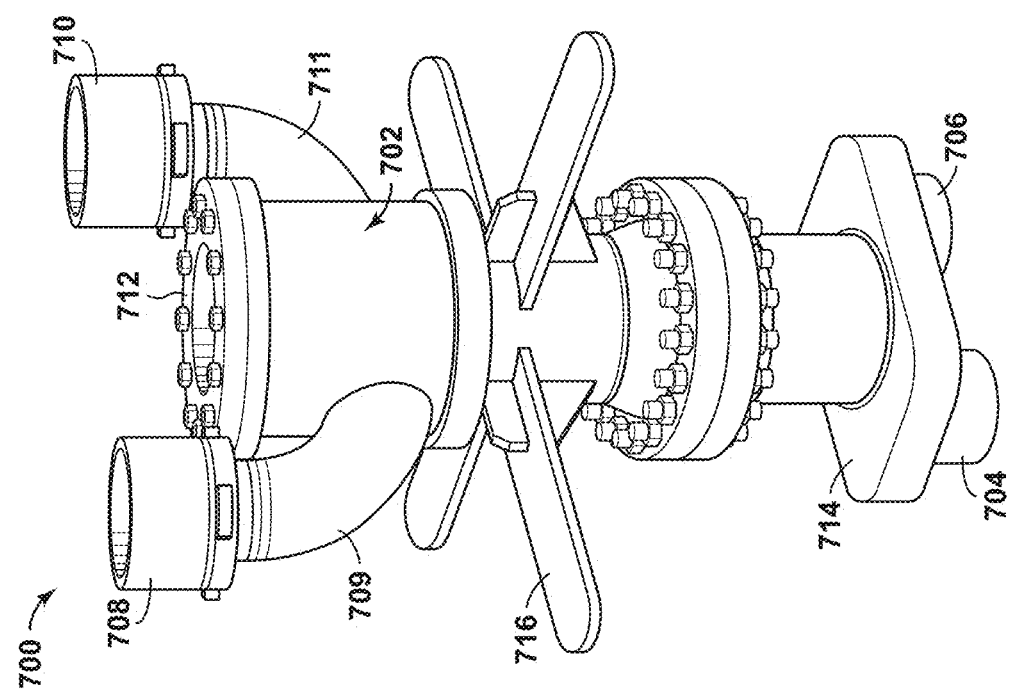
Figure 7C:
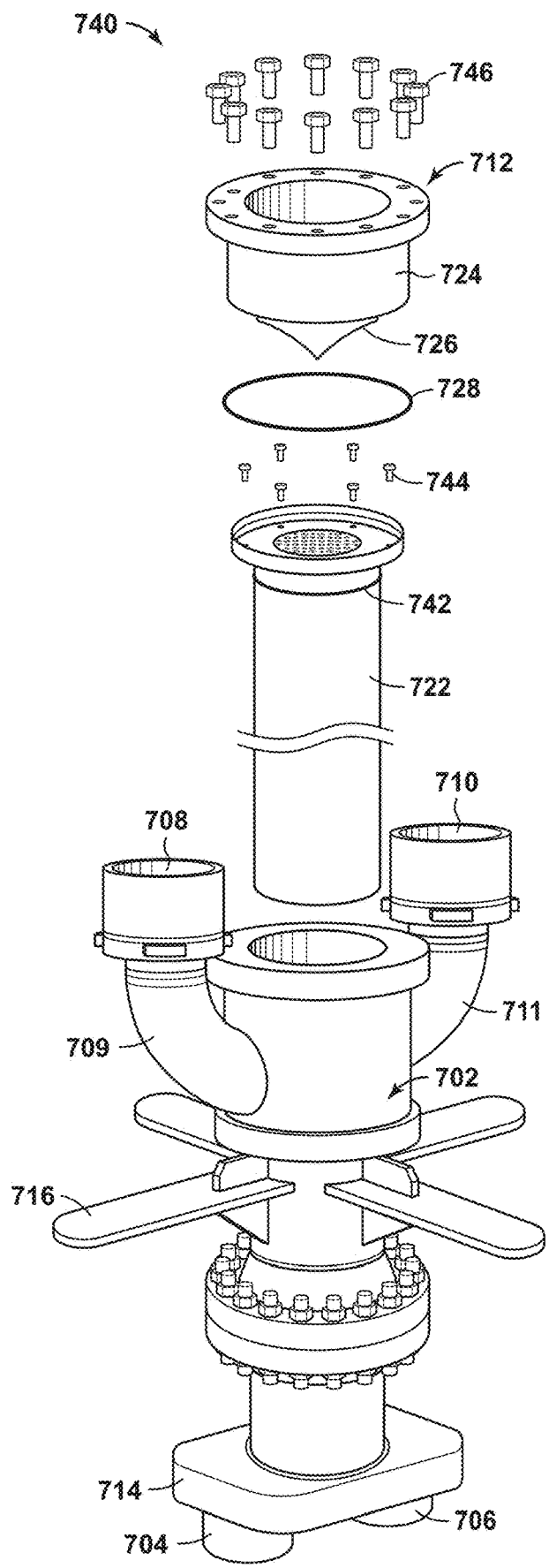
Figure 7E:
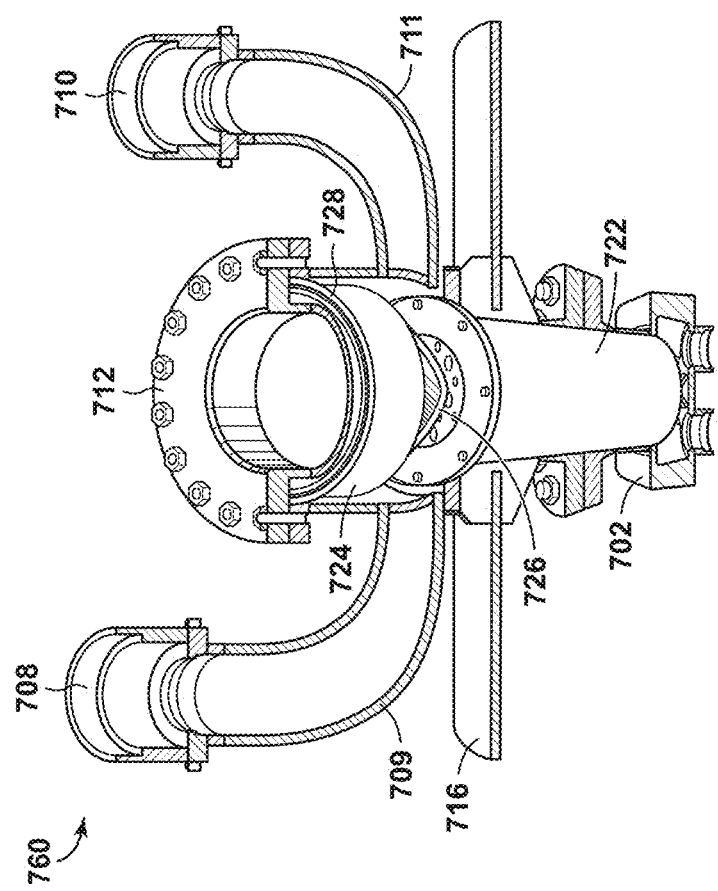
Figure 7F:
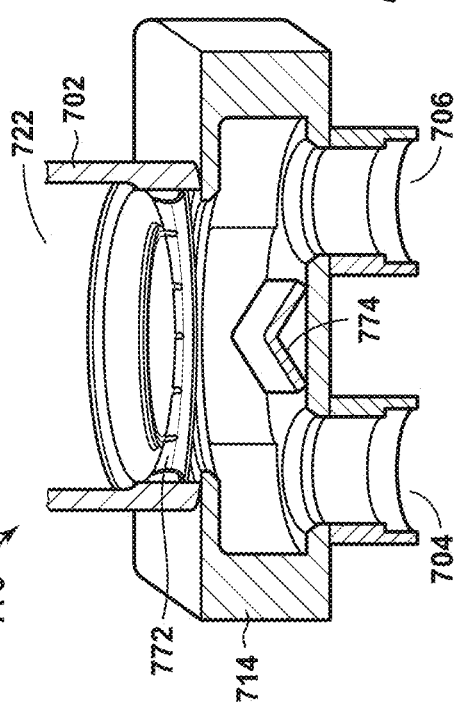
Figure 7D:
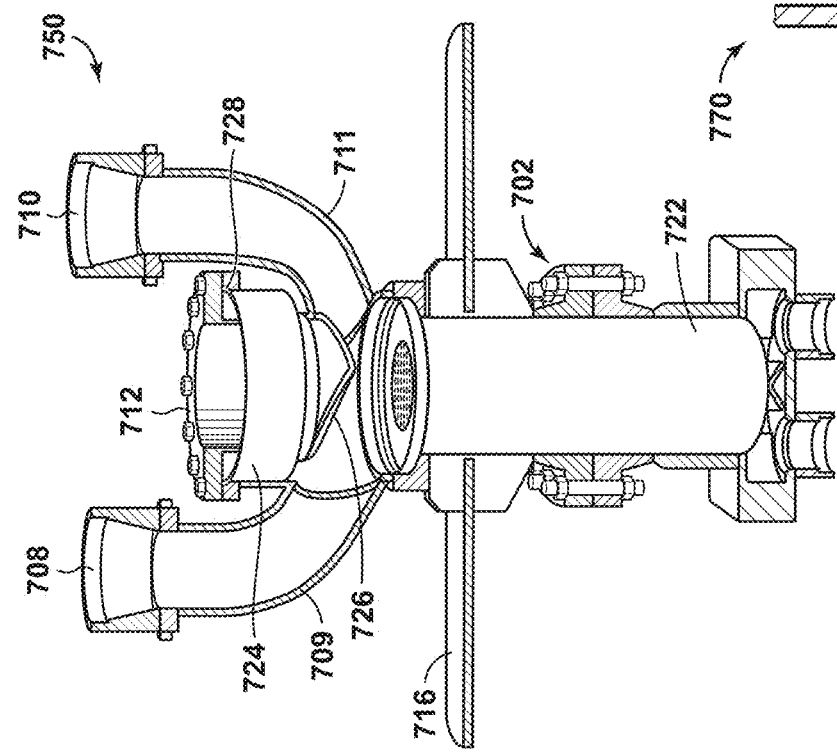

FIG. 7A is a diagram 700 of an elevation view of the adsorbent bed unit. FIG. 7B is a diagram 720 of a cut-away view of the adsorbent bed unit of FIG. 7A. In this diagram 720, the adsorbent bed 722 is disposed within the housing 702. Further, the head 712 includes closure cover 724, feed flow diverter 726 and gasket 728, while the lower head 714 includes a product flow diverter 730. The closure cover 724 lessens the dead volume and hinders fluid flow toward the head 712, the feed flow diverter 726 directs the feed stream from the curved body portion 709 or 711 toward the adsorbent bed 722, and the gasket 728 provides a sealing mechanism to hinder flow to the external locations from the head 712. The product feed diverter 730 directs the product stream from the adsorbent bed 722 toward one of the valve openings 704 or 706. FIG. 7C is a diagram 740 of an exploded view of the adsorbent bed unit of FIG. 7A. In this diagram 740, the different components of the adsorbent bed 722 and the head 712 are shown. For example, an internal seal 742 is disposed between the adsorbent bed 722 and the housing 702 to hinder flow of any fluids and to lessen or prevent fluid from bypassing the adsorbent bed 722. Further, bed fastening elements 744 are utilized to secure the adsorbent bed 722 to the housing 702, while fastening elements 746 are utilized to secure the head 712 to the housing 702. FIG. 7D is a diagram 750 of a cut away view of the upper portion of the adsorbent bed unit of FIG. 7A, while FIG. 7E is a diagram 760 of an alternative cut away view of the upper portion of the adsorbent bed unit of FIG. 7A. FIG. 7F is a diagram 770 of a cut away view of the lower portion of the adsorbent bed unit of FIG. 7A. In this diagram 770, a thermal expansion ring 772 is disposed between the adsorbent bed 722 and the head 714. The thermal expansion ring 772 may be a tension ring that secures the adsorbent bed into a concentric configuration and to provide for axial thermal expansion of the adsorbent bed 722.

The adsorbent bed unit in the diagrams 700, 700, 720, 740, 750, 760 and 770 may be used to perform swing adsorption processes. For example, the swing adsorption process involves a feed step and a regeneration step (e.g., a purge step) that form the cycle. The feed step may involve passing a feed stream through the valve opening 708 to the adsorbent bed 722 and passing a product stream through the valve opening 704. Once the feed stream is interrupted, the regeneration step may involve performing one or more depressurization steps and/or one or more purge steps. The depressurization step may include flowing fluids from the adsorbent bed 722 through the valve opening 710, while the purge step may include passing a purge stream through the valve opening 706 to the adsorbent bed 722 and passing a purge vent stream from the adsorbent bed 722 through the valve opening 710. As may be appreciated, additional process streams may be included in the process with additional valves in other embodiments.

Figure 5A:
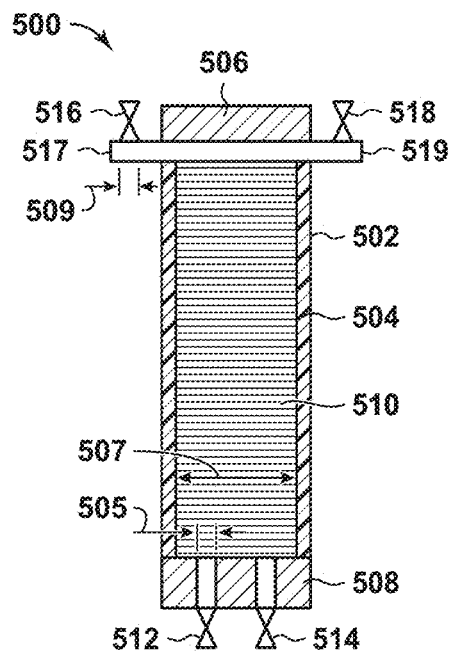
FIGS. 5A, 5B, 5C and 5D are additional diagrams of a portion of an adsorbent bed unit having associated valve assemblies in accordance with alternative embodiments of the present techniques.
Figure 5B:
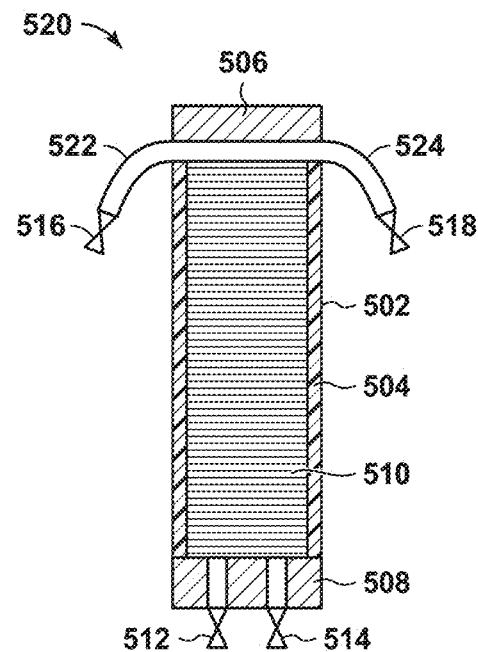
Figure 5C:
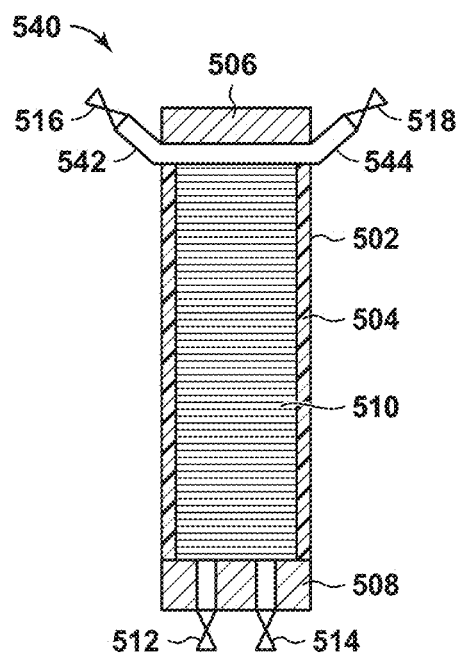
Figure 5D:
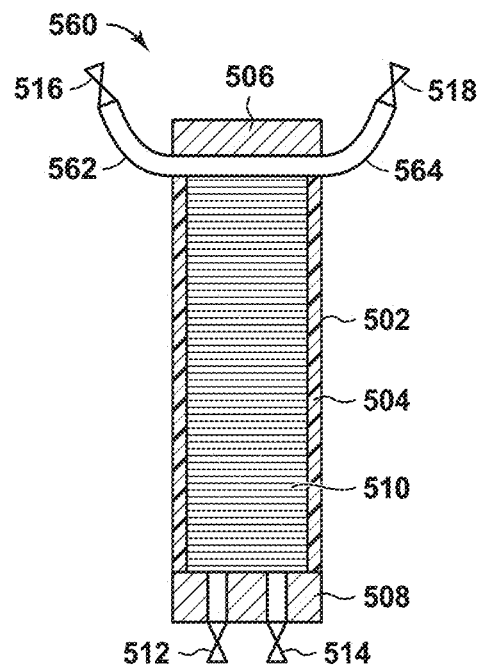

As may be appreciated, the vane or diverter for either of the heads may be configured to manage the flow of the fluids through the adsorbent bed or from the adsorbent bed. For example, as shown in FIG. 7B, the angle of the feed flow diverter 726 (e.g., vane in head 712) may be about equal to the angle of the respective curved body portion 709 or 711 (e.g., valve conduit) entering the interior region, and this angle may be selected such that the innermost surface of the conduit and/or vane projects linearly to the opposite edge of the adsorbent bed 722, thereby distributing flow across the entire adsorbent bed 722. In a different configurations, the valve conduits, such as curved body portions 709 or 711, may be substantially perpendicular to the predominant adsorbent bed flow direction and may be directly opposite each other (e.g., as shown in FIG. 5A). In such configurations, the diverter or vane may deflect the fluid flow path to prevent flow from one conduit from being directed directly toward and entering the opposing conduit. The curved conduits or body portions lessen any pressure drop as the fluids pass between the conduits and the adsorbent bed. Also, beyond lessening pressure drop, the curved shape of the valve conduits or body portions may be used to maintain a vertical orientation for the valves, which may lessen wear on the valve (e.g., valve stem) due to uneven weighting of the valve components).

FIGS. 8A, 8B and 8C are diagrams 800, 820 and 840 of a portion of the adsorbent bed unit and the associated thermal expansion ring in accordance with an embodiment of the present techniques. The diagrams 800, 820 and 840 include an adsorbent bed 802 and portion of the thermal expansion ring 804 in different configurations.

For example, FIG. 8A is a partial cutaway diagram 800 of an exemplary embodiment of a portion of the adsorbent bed 802 and a portion of the thermal expansion ring 804. The thermal expansion ring 804, which is in an unloaded or expanded state, is disposed between the adsorbent bed 802 and the adsorbent bed unit's housing or head (not shown). FIG. 8B is a partial cutaway of an exploded diagram 820 of the portion of the adsorbent bed 802 and thermal expansion ring 804 within the housing 824 of the adsorbent bed unit. In this diagram 820, the thermal expansion ring 804 is disposed between the adsorbent bed 802 and the head 822, but remains in an unloaded or expanded state. FIG. 8C is a partial cutaway of a diagram 820 of the portion of the adsorbent bed 802 and thermal expansion ring 804 within the housing 824 of the adsorbent bed unit. In this diagram 840, the thermal expansion ring 804 is disposed between the adsorbent bed 802 and the head 822 and is in a compressed state. The thermal expansion ring 804 includes various notches 842 to provide flexibility in the loaded or compressed state.

As may be appreciated, the thermal expansion ring 804 has different enhancement to provide support the adsorbent bed 802. For example, the curvature of the thermal expansion ring is configured to bend from the unloaded state to the compressed state. Further, the notches 842 in the thermal expansion ring 804 may be used to lessen fatigue of the thermal expansion ring 804. Also, the thermal expansion ring 804 may be fabricated from a material, such as steel.

FIGS. 9A, 9B, 9C, 9D and 9E are diagrams 900, 920, 940, 960 and 970 of catch mechanisms in accordance with an embodiment of the present techniques. These catch mechanisms may be used to deflect foreign debris that may be fall into the interior region of the adsorbent bed during maintenance operations, such as exchanging the adsorbent bed. The catch mechanism may provide a path and access to material within the lower head or portion of the adsorbent bed unit.

For example, FIGS. 9A and 9B are an exemplary embodiment of a catch mechanism for an adsorbent bed unit. In these diagrams 900 and 920, a portion of an adsorbent bed unit, which may be one of the adsorbent bed units in FIG. 4A to 4B, 5A to 5D or 7A to 7F, is shown. In these diagrams 900 and 920, the portion of the adsorbent bed unit includes an adsorbent bed 902 disposed within a body portion or housing 904 and a head 906. Valves, such as valves 908 and 910, are attached to the head 906 to provide fluid flow paths between the adsorbent bed 902 and an external locations.

To deflect the debris within the adsorbent bed unit during maintenance, a catch mechanism may be utilized to provide a seal during swing adsorption operations and to remove debris from the interior region of the adsorbent bed unit. The catch mechanism may include a maintenance port 912 and a debris foil 914. In diagram 900, the debris foil 914 is disposed through the maintenance port 912 and angled to have any debris that enters the interior region and moves toward the head 906 to be blocked from the valves 908 and 910 by the catch plat 914. In diagram 920, the debris foil 914 is removed and a plug (not shown) is installed into the maintenance port 912. The plug may be used to seal the port and to hinder any fluid flow between the maintenance port 912 and locations external to the adsorbent deb unit's interior region.

As another example, FIGS. 9C, 9D and 9E are an exemplary embodiment of another catch mechanism for an adsorbent bed unit. In these diagrams 940, 960 and 970, a portion of an adsorbent bed unit is shown, which may be similar to the adsorbent bed units in FIG. 4A to 4B, 5A to 5D or 7A to 7F, except for the lower valve placements and associated head. In these diagrams 940, 960 and 970, the portion of the adsorbent bed unit includes an adsorbent bed 942 disposed within a body portion or housing 944 and a head 946. Valves, such as poppet valves 948 and 950, are attached to the head 946 to provide fluid flow paths between the adsorbent bed 942 and an external locations.

Similar to the configuration above, a catch mechanism may be utilized to provide a seal during swing adsorption operations and to remove debris from the interior region of the adsorbent bed unit. The catch mechanism may include a maintenance port 952 and a debris foil 954 and a catch plug 956. In diagram 940 of FIG. 9C, the debris foil 954 is disposed through the maintenance port 952 and angled to have any debris that enters the interior region and moves toward the head 956 to be blocked from the valves 948 and 950 by the debris foil 954. Also, the catch plug 956 is decoupled from the maintenance port 952 to provide access for the debris foil 954 within the maintenance port 952 and this portion of the adsorbent bed unit. In diagram 960 of FIG. 9D, the debris foil 954 is removed and a catch plug 956 is installed into the maintenance port 952 with fasteners. The catch plug 956 may be used to seal the port and to hinder any fluid flow between the maintenance port 952 and locations external to the adsorbent deb unit's interior region. In diagram 970 of FIG. 9E, a top view of the portion of the adsorbent bed unit in FIGS. 9C and 9D is shown.

Figure 10B:
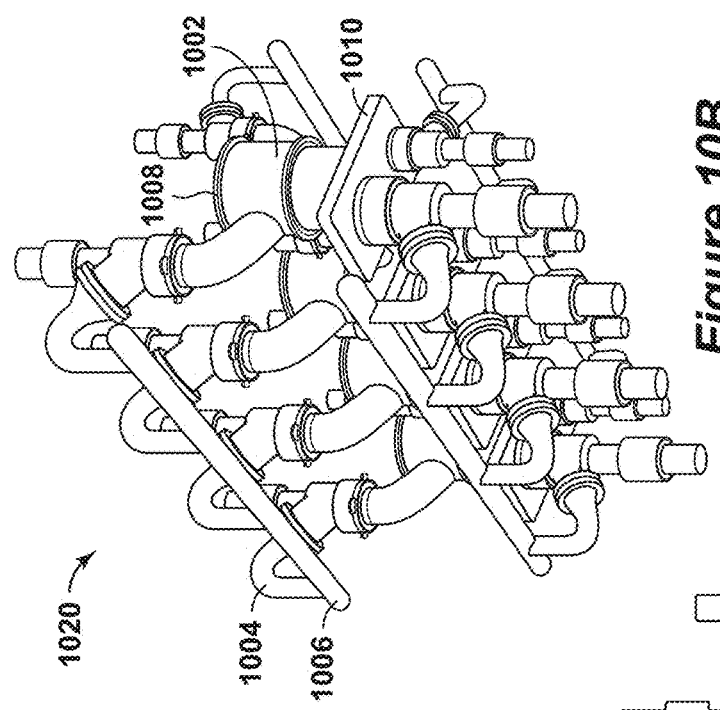
FIGS. 10A, 10B and 10C are three-dimensional diagrams of a swing adsorption system having four adsorbent bed units and interconnecting piping in accordance with an embodiment of the present techniques.
Figure 10C:
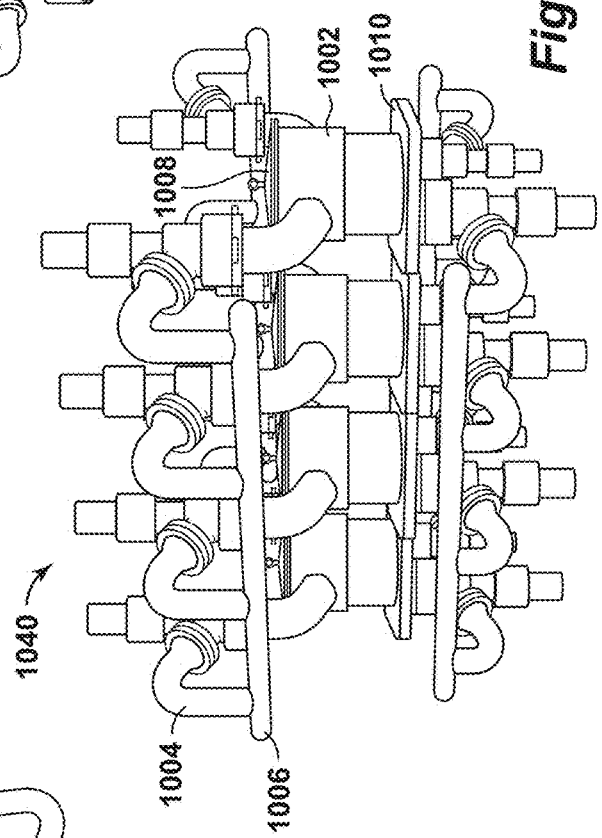
Figure 10A:
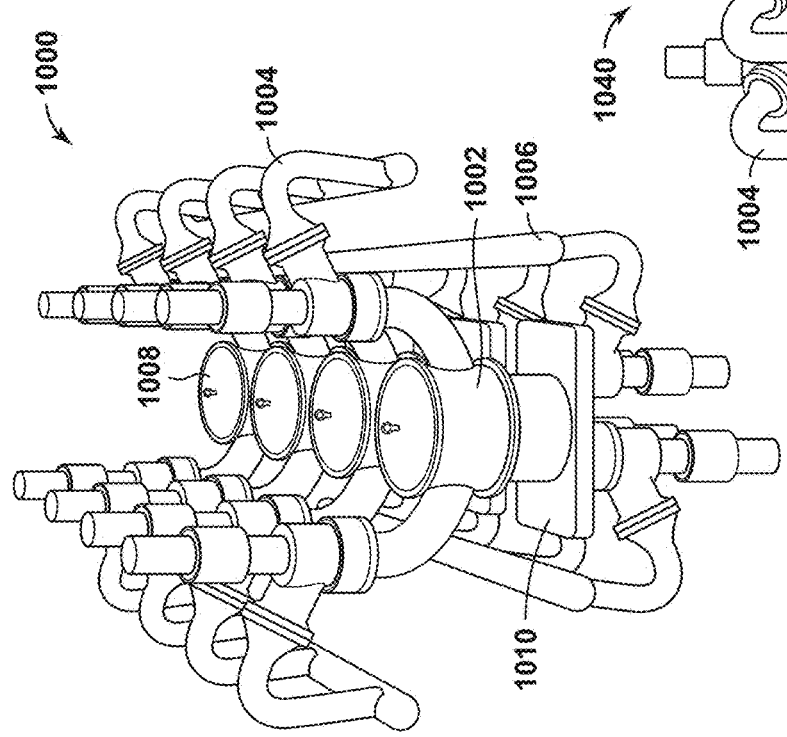

FIGS. 10A, 10B and 10C are three-dimensional diagrams 1000, 1020 and 1040 of a swing adsorption system having four adsorbent bed units and interconnecting piping in accordance with an embodiment of the present techniques. While this configuration is a specific example of a skid, this specific configuration is for exemplary purposes as other configurations may include different numbers of adsorbent bed units.

In this system, the adsorbent bed units, such as adsorbent bed unit 1002, may be configured for a cyclical swing adsorption process for removing contaminants from feed streams (e.g., fluids, gaseous or liquids). For example, the adsorbent bed unit 1002 may include various conduits (e.g., conduit 1004) for managing the flow of fluids through, to or from the adsorbent bed within the adsorbent bed unit 1002. These conduits from the adsorbent bed units 1002 may be coupled to a manifold (e.g., manifold 1006) to distribute the flow of the stream to, from or between components. The adsorbent bed within an adsorbent bed unit may separate one or more contaminants from the feed stream to form a product stream. As may be appreciated, the adsorbent bed units may include other conduits to control other fluid steams as part of the process, such as purge streams, depressurizations streams, and the like.

This configuration of the swing adsorption system provides various enhancement to the operation of the process. For example, the system includes valves for one of the heads, such as upper or first head 1008, disposed at outboard locations (e.g., outside the perimeter of the head 1008 and the interface cross sectional area of the adsorbent bed (not shown)). The other valves for the lower or second head, such as head 1010, are disposed at least partially within the perimeter of the second head or the interface cross sectional area of the adsorbent bed. In this manner, the adsorbent bed within the adsorbent bed units may be accessed without having to remove any valves, conduits and/or manifolds.

FIGS. 11A, 11B, 11C, 11D, 11E and 11F are diagrams 1100, 1110, 1120, 1130, 1140, and 1150 of portions of an adsorbent bed units having alternative valve assemblies and manifolds in accordance with an embodiment of the present techniques. The alternative valve configurations may be used to manage the distribution of equipment on a skid.

Figure 11A:
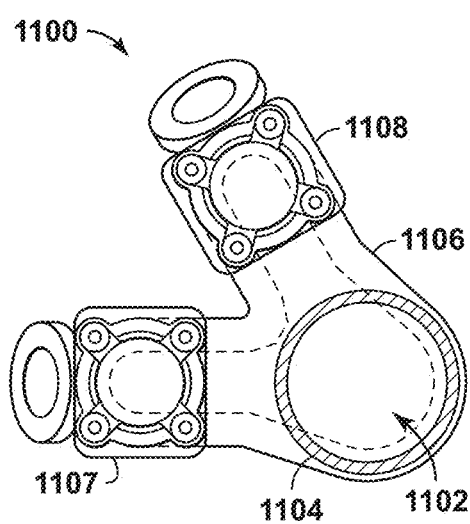
FIGS. 11A, 11B, 11C, 11D, 11E and 11F are diagrams of alternative adsorbent bed unit configurations in accordance with an embodiment of the present techniques.
Figure 11B:
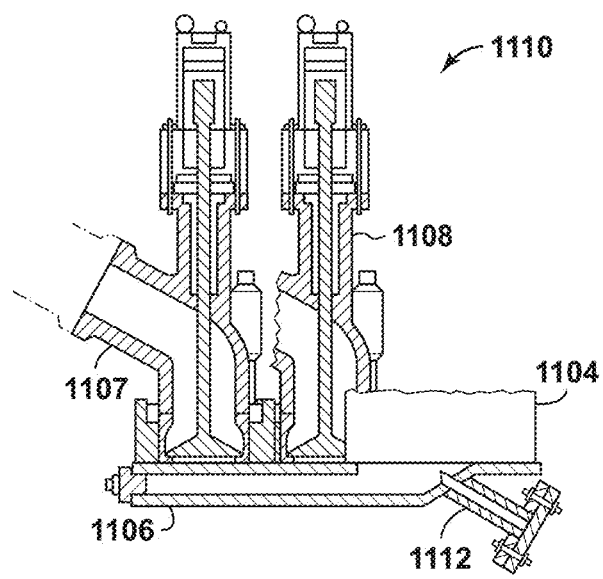

For example, FIGS. 11A and 11B are an exemplary embodiment of a first alternative embodiment for a portion of an adsorbent bed unit. In these diagrams 1100 and 1110, a portion of an adsorbent bed unit, which may be one of the adsorbent bed units in FIG. 4A to 4B, 5A to 5D or 7A to 7F, is shown. In these diagrams 1100 and 1110, the portion of the adsorbent bed unit includes an interior region 1102 for housing an adsorbent bed (not shown) disposed within a body portion or housing 1104 and a head 1106. Valves, such as poppet valves 1107 and 1108, are attached to the head 1106 to provide fluid flow paths between the adsorbent bed and an external locations. The valves in this configuration are positioned in as non-opposing valves on the same operating plane. The diagram 1100 is a top view of the portion of the adsorbent bed unit, while diagram 1110 of FIG. 11B is a side view of the portion of the adsorbent bed unit. In this diagram 1110, a catch mechanism 1112 is disposed on the lower portion of the head 1106, which may operate as discussed above in reference to FIGS. 9A to 9E.

Figure 11C:
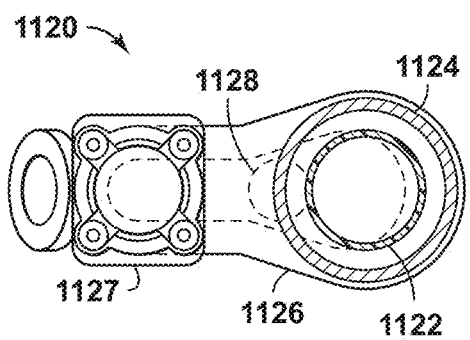
Figure 11D:
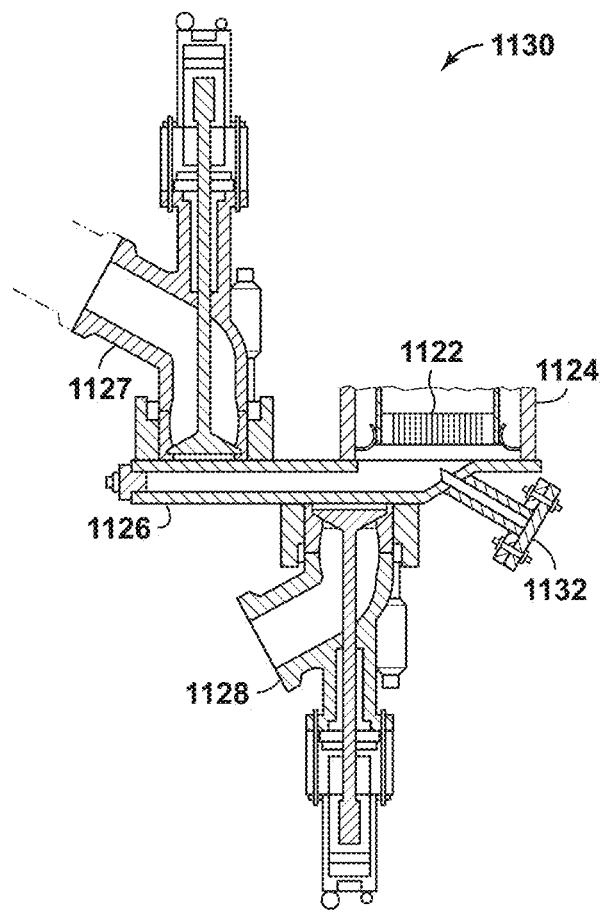

As another example, FIGS. 11C and 11D are an exemplary embodiment of a second alternative embodiment for a portion of an adsorbent bed unit. In these diagrams 1120 and 1130, a portion of an adsorbent bed unit, which may be one of the adsorbent bed units in FIG. 4A to 4B, 5A to 5D, 7A to 7F or 8C to 8E, is shown. In these diagrams 1120 and 1130, the portion of the adsorbent bed unit includes an adsorbent bed 1122 disposed within a body portion or housing 1124 and a head 1126. Valves, such as poppet valves 1127 and 1128, are attached to the head 1126 to provide fluid flow paths between the adsorbent bed and an external locations. The valves in this configuration are positioned in as alternative valve placement in opposing directions. The diagram 1120 is a top view of the portion of the adsorbent bed unit, while diagram 1130 is a side view of the portion of the adsorbent bed unit. In this diagram 1130, a catch mechanism 1132 is disposed on the lower portion of the head 1126, which may operate as discussed above in reference to FIGS. 9C to 9E.

Figure 11F:
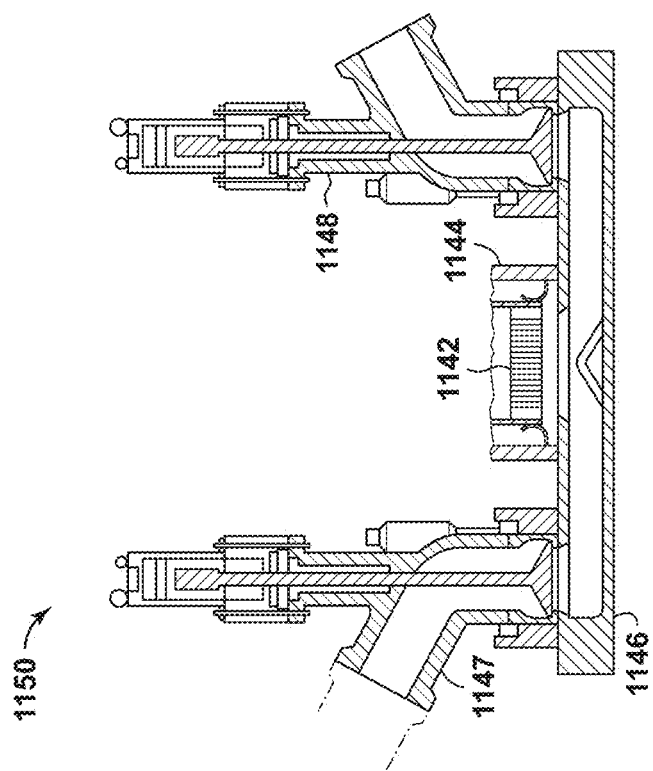
Figure 11E:
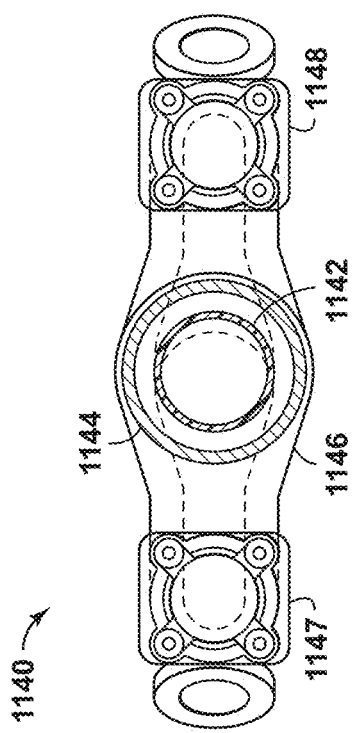

As another example, FIGS. 11E and 11F are an exemplary embodiment of a third alternative embodiment for a portion of an adsorbent bed unit. In these diagrams 1140 and 1150, a portion of an adsorbent bed unit, which may be one of the adsorbent bed units in FIGS. 4A to 4B, 5A to 5D, 7A to 7F, is shown. In these diagrams 1140 and 1150, the portion of the adsorbent bed unit includes an adsorbent bed 1142 disposed within a body portion or housing 1144 and a head 1146. Valves, such as poppet valves 1147 and 1148, are attached to the head 1146 to provide fluid flow paths between the adsorbent bed and an external locations. The valves in this configuration are positioned in as alternative placement in the same operating plane. The diagram 1140 is a top view of the portion of the adsorbent bed unit, while diagram 1150 is a side view of the portion of the adsorbent bed unit.

Figure 12:
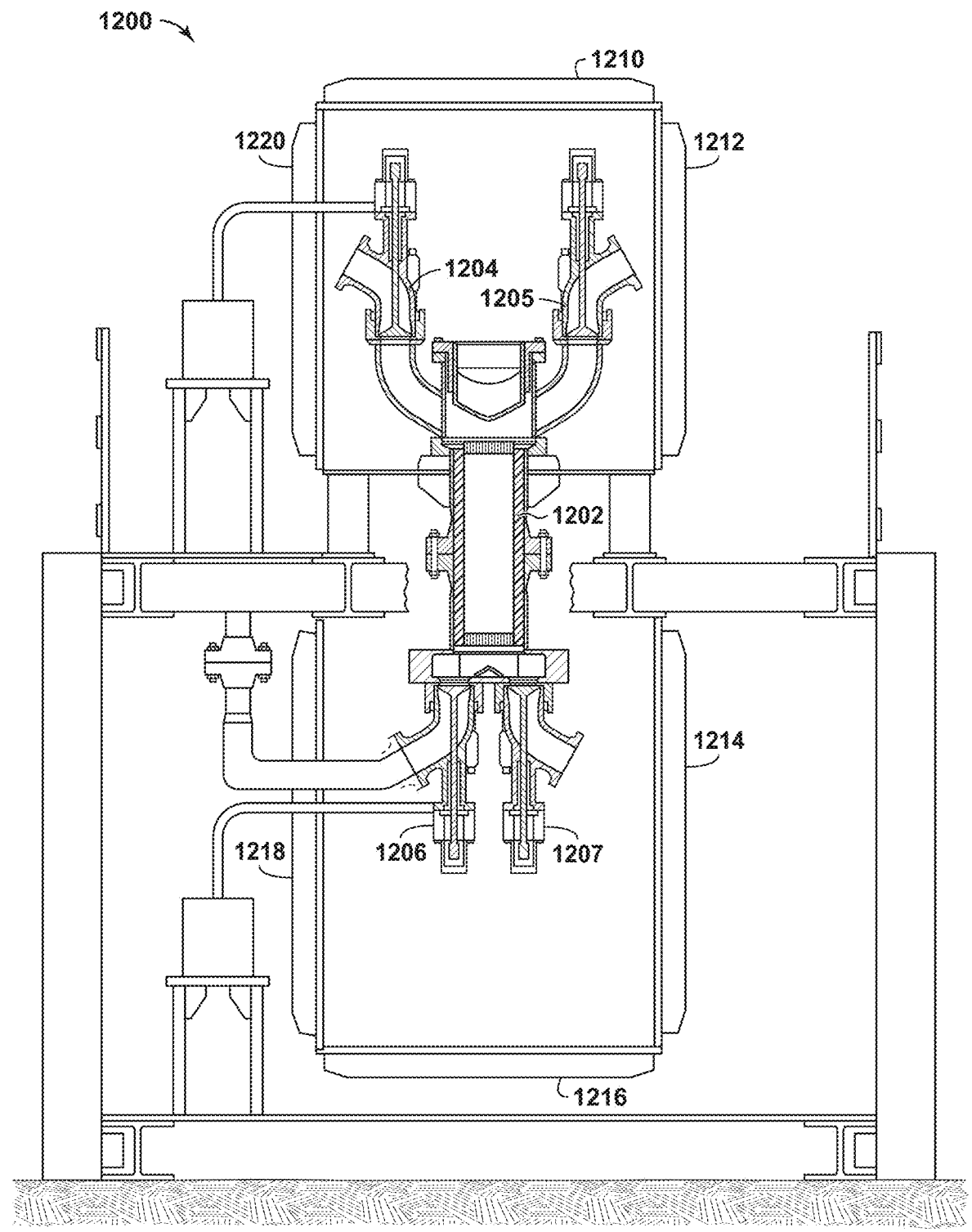
FIG. 12 is three-dimensional diagram of a adsorbent bed unit disposed in an acoustic dampening system in accordance with an embodiment of the present techniques.

In yet another configuration, FIG. 12 is three-dimensional diagram 1200 of an adsorbent bed unit 1202 disposed in an acoustic dampening system in accordance with an embodiment of the present techniques. In this configuration, the adsorbent bed unit 1202 includes various poppet valves, such as valves 1204, 1205, 1206 and 1207. The operation of these poppet valves for a rapid swing adsorption process may produce large amounts of acoustic noise. Accordingly, an acoustic dampening system may be utilized to suppress the sound produced from the adsorbent bed unit 1202. The acoustic dampening system may include various acoustic panels 1210, 1212, 1214, 1216, 1218 and 1220 disposed around the adsorbent bed unit 1202. These acoustic panels 1210, 1212, 1214, 1216, 1218 and 1220 may be configured to reflect the acoustic waves within the acoustic dampening system or may be configured to adsorb a portion of the acoustic waves generated by the adsorbent bed unit.

As may be appreciated, the acoustic dampening system may further include various enhancements. For example, additional panels may be provided to surround the acoustic panels 1210, 1212, 1214, 1216, 1218 and 1220 by forming a secondary acoustic dampening layer around the first acoustic dampening layer (e.g., acoustic panels 1210, 1212, 1214, 1216, 1218 and 1220). Further, as another example, one or more enclosures may be positioned surrounding the valves 1204, 1205, 1206 and 1207.

As may be appreciated, the present techniques may be utilized to enhance swing adsorption processes. By way of example, a process for removing contaminants from a feed stream may include performing one or more adsorption steps and one or more purge steps. In performing one or more adsorption steps in an adsorbent bed unit, each of the adsorption steps may include (i) opening a plurality of feed poppet valves to pass a gaseous feed stream from a feed inlet conduit to an adsorbent bed disposed in an interior region of a housing of the adsorbent bed unit, (ii) exposing the gaseous feed stream to the adsorbent bed to separate one or more contaminants from the gaseous feed stream to form a product stream, and (iii) opening one or more product poppet valves to conduct away the product stream from the interior region in the housing to a product conduit. Each of the plurality of feed poppet valves may be in direct flow communication with the feed inlet conduit and may be configured to control fluid flow along a flow path extending from a location external to the housing through the feed inlet conduit and to the adsorbent bed. Further, at least one of the plurality of poppet valves for one end of the adsorbent bed have a valve cross sectional area disposed outside an interface cross sectional area of the adsorbent bed. At the other or second end, at least one of the plurality of poppet valves for the other end of the adsorbent bed have a valve cross sectional area disposed at least partially within an interface cross sectional area of the adsorbent bed. In addition, in performing one or more purge steps, each of the one or more purge steps may include passing a purge stream into the adsorbent bed unit to conduct away at least a portion of the one or more contaminants in a purge output stream. Then, the adsorption and purge steps may be repeated for at least one additional cycle, wherein the cycle duration is for a period greater than 1 second and less than 600 seconds.

Further, the process may include other enhancements. For example, the process may involve moving a common actuation mechanism to open the plurality of valves; passing the gaseous feed stream through a flow path around a filler material disposed adjacent to the adsorbent bed; distributing the gaseous feed stream to the adsorbent bed via a flow distributor disposed between the adsorbent bed and the plurality of feed poppet valves; and/or linearly moving with a feed actuating mechanism at least one feed valve stem to provide a feed opening between a feed disk element coupled to the at least one feed valve stem and a feed seat secured to the housing of the adsorbent bed unit. In addition, the process may include the cycle duration being for a period greater than 1 second and less than 90 seconds to separate one or more contaminants from the gaseous feed stream to form the product stream; providing a gaseous feed stream that is a hydrocarbon containing stream having greater than one volume percent hydrocarbons based on the total volume of the feed stream; and/or maintaining the feed pressure during the adsorption step in the range between 400 pounds per square inch absolute (psia) and 1,400 psia.

To manufacture systems and/or adsorbent bed units, various manufacturing techniques may be utilized. By way of example, the method of manufacturing a cyclical swing adsorbent bed unit may include: forming a housing having an interior region, wherein the housing comprises a body portion, a first head and a second head; disposing an adsorbent bed within the interior region of the housing; securing a plurality of first valves into the first head; securing a second plurality of valves to the housing at the end near the second head, wherein the second head does not have any valves; wherein each of the plurality of first and second valves are configured to control fluid flow along a flow path extending from a location external to the housing to the adsorbent bed, wherein at least one of the plurality of first valves have a valve cross sectional area disposed at least partially within of an interface cross sectional area of the adsorbent bed and wherein each of the plurality of second valves have a valve cross sectional area disposed outside of an interface cross sectional area of the adsorbent bed and/or the second head's cross sectional area.

In one or more embodiments, the material may include an adsorbent material supported on a non-adsorbent support. Non-limiting examples of adsorbent materials may include alumina, microporous zeolites, carbons, cationic zeolites, high silica zeolites, highly siliceous ordered mesoporous materials, sol gel materials, aluminum phosphorous and oxygen (ALPO) materials (microporous and mesoporous materials containing predominantly aluminum phosphorous and oxygen), silicon aluminum phosphorous and oxygen (SAPO) materials (microporous and mesoporous materials containing predominantly silicon aluminum phosphorous and oxygen), metal organic framework (MOF) materials (microporous and mesoporous materials comprised of a metal organic framework) and zeolitic imidazolate frameworks (ZIF) materials (microporous and mesoporous materials comprised of zeolitic imidazolate frameworks). Other materials include microporous and mesoporous sorbents functionalized with functional groups. Examples of functional groups, which may be used for $CO_2$ removal, may include primary, secondary, tertiary and other non protogenic basic groups such as amidines, guanidines and biguanides.

In one or more embodiments, the adsorbent bed unit may be utilized to separate contaminants from a feed stream. The method may include passing a gaseous feed stream at a feed pressure through an adsorbent bed unit having an adsorbent contactor to separate one or more contaminants from the gaseous feed stream to form a product stream; interrupting the flow of the gaseous feed stream; performing a depressurization step, wherein the depressurization step reduces the pressure within the adsorbent bed unit; performing a purge step, wherein the purge step reduces the pressure within the adsorbent bed unit; performing a re-pressurization step, wherein the re-pressurization step increases the pressure within the adsorbent bed unit; and repeating the steps a) to e) for at least one additional cycle.

Further, in one or more embodiments, the adsorbent bed unit may include an adsorbent bed that can be used for the separation of a target gas form a gaseous mixture. The adsorbent is usually comprised of an adsorbent material supported on a non-adsorbent support, or contactor. Such contactors contain substantially parallel flow channels wherein 20 volume percent, preferably 15 volume percent or less of the open pore volume of the contactor, excluding the flow channels, is in pores greater than about 20 angstroms. A flow channel is taken to be that portion of the contactor in which gas flows, if a steady state pressure difference is applied between the point or place at which a feed stream enters the contactor and the point or place at which a product stream leaves the contactor. In the contactor, the adsorbent is incorporated into the wall of the flow channel.

In yet another embodiment, a cyclical swing adsorbent bed unit for removing contaminants from a gaseous feed stream is described. The adsorbent bed unit comprising: a housing forming an interior region; an adsorbent bed disposed within the interior region; and a plurality of valves secured to the housing, wherein each of the plurality of valves is configured to control fluid flow along a flow path extending from a location external to the housing through a conduit and to the adsorbent bed, wherein one of the heads does not have any valves disposed within the perimeter of the head or within the head's cross sectional.

Further, the adsorbent bed units may include actively-controlled poppet valves and passively-controlled valves. The actively-controlled poppet valves, which may be referred to as actively-controlled poppet valve assemblies, may each include stem element secured to a disk element that is seatable within the head or a disk element that is seatable within a separate valve seat inserted within the head. The stem element may be connected to an actuating mechanism, such as electro-hydraulic or electro-pneumatic actuating mechanisms, which is configured to have the respective valve impart linear motion to the respective stem element. As may be appreciated, the actuating mechanism may be operated independently for different steps in the process to activate a single valve or a single actuating mechanism may be utilized to control two or more valves. As an example, opening an actively-controlled poppet valve may include linearly moving with a actuating mechanism at least one valve stem to provide an opening between a disk element coupled to the at least one valve stem and a seat secured to the housing of the adsorbent bed unit. As another example, opening actively-controlled poppet valves may include linearly moving a lift plate secured to the valve stems with an actuating mechanism to provide openings, wherein each of the valve stems is secured to a disk element and each of the openings forms a gap or flow path between the disk element and an associated seat secured to the housing of the adsorbent bed unit.

The passively-controlled valve may include passively-controlled poppet valves, passively-controlled check valves, passively-controlled reed valves, and the other suitable passively-controlled valves. For example, the passively-controlled poppet valves, which may be referred to as passively-controlled poppet valve assemblies, may each include stem element secured to a disk element that is seatable within the head or a disk element that is seatable within a separate valve seat inserted within the head. The stem element may be connected to a biasing mechanism, such as a spring or other biasing mechanisms, which is configured to have the respective valve impart linear motion to the respective stem element. As may be appreciated, the biasing mechanism may be operated independently for different steps in the process and may be activated based on a pressure differential to activate a single valve or two or more valves. One configuration of a passively-controlled poppet valve may include a spring-loaded passively-controlled poppet valve. In this spring-loaded configuration, the disk element may be an integral component with a hollow stem element, which has the springs disposed at least partially within the hollow stem element. As an example, the opening of passively-controlled poppet valves may include linearly moving with a product biasing mechanism at least one product valve stem to provide a product opening between a product disk element coupled to the at least one product valve stem and a product seat secured to the housing of the adsorbent bed unit. The product biasing mechanism may be configured to move linearly based on a pressure differential between the interior region and the product conduit exceeding a specific threshold. In other configurations, the linear movement based on the pressure differential may be different for various valves operating in phase. For example, the passively-controlled valves operating in phase may involve a range or a differential window of less than 25%, less than 20% or less than 10% (e.g., differential window may be calculated as the highest pressure differential minus the lowest pressure differential with that difference being divided by the highest pressure differential). As another example, a passively-controlled valve may also be configured as a reed-valve comprised of a flexible strip of metal or composite material anchored on one end and bending to open the passively controlled flow area. The passively-controlled reed valve may be utilized to provide more flow at a given differential pressure in a given footprint.

In one or more embodiments, the rapid cycle swing adsorption process in the present techniques is a rapid cycle temperature swing adsorption (RCTSA) and a pressure swing adsorption (PSA). For RCTSA the total cycle times are typically less than 600 seconds, preferably less than 200 seconds, more preferably less than 100 seconds, and even more preferably less than 60 seconds.

In view of the many possible embodiments to which the principles of the disclosed invention may be applied, it should be recognized that the illustrative embodiments are only preferred examples of the invention and should not be taken as limiting the scope of the invention.

What is claimed is:

1. A process for removing contaminants from a feed stream, the process comprising:
    a) performing one or more adsorption steps in an adsorbent bed unit, wherein each of the one or more adsorption steps comprise: (i) opening at least one first poppet valve to pass a gaseous feed stream from a feed inlet conduit to an adsorbent bed disposed in an interior region of a housing of the adsorbent bed unit, wherein the at least one first poppet valve is in direct flow communication with the feed inlet conduit and configured to control fluid flow along a flow path extending from a location external to the housing through the feed inlet conduit and to the adsorbent bed, wherein the at least one first poppet valve has a first valve cross sectional area disposed outside of an interface cross sectional area of the adsorbent bed, (ii) exposing the gaseous feed stream to the adsorbent bed to separate one or more contaminants from the gaseous feed stream to form a product stream, and (iii) opening one or more product poppet valves to conduct away the product stream from the interior region in the housing to a product conduit;
    b) performing one or more purge steps, wherein each of the one or more purge steps comprise passing a purge stream into the adsorbent bed unit to conduct away at least a portion of the one or more contaminants in a purge output stream, wherein the purge output stream is passed through at least one second poppet valve, wherein the at least one second poppet valve has a second valve cross sectional area disposed outside of an interface cross sectional area of the adsorbent bed; and
    c) repeating the steps a) to b) for at least one additional cycle, wherein the cycle duration is for a period greater than 1 second and less than 600 seconds.

2. The process of claim 1, wherein the at least one first poppet valve and the at least one second poppet valve are in direct fluid communication with the adsorbent bed through a conduit.

3. The process of claim 1, wherein the at least one first poppet valve is in direct fluid communication with the adsorbent bed through a first conduit and the at least one second poppet valve is in direct fluid communication with the adsorbent bed through a second conduit.

4. The process of claim 1, wherein the opening the at least one first poppet valve further comprises distributing the gaseous feed stream to the adsorbent bed via a flow diverter disposed between the adsorbent bed and the at least one first poppet valve.

5. The process of claim 1, wherein opening the at least one first poppet valve further comprise linearly moving with a first actuating mechanism at least one valve stem to provide an opening between a disk element coupled to the at least one valve stem and a seat secured to a portion of the adsorbent bed unit.

6. The process of claim 1, further comprising:
    interrupting the cycle;
    removing a head from the adsorbent bed unit near the at least one first poppet valve and the at least one second poppet valve to expose an opening to the interior region; and
    removing the adsorbent bed from the interior region, wherein the at least one first poppet valve and the at least one second poppet valve are coupled to the adsorbent bed unit.

7. The process of claim 6, further comprising:
    disposing a second adsorbent bed into the interior region;
    securing the head to the adsorbent bed unit; and
    resuming the cycle for the process.

8. The process of claim 6, further comprising guiding the adsorbent bed unit within the interior region with a thermal expansion ring.

9. The process of claim 6, further comprising: inserting a debris foil into a port prior to removing the head.

10. The process of claim 6, wherein removing the adsorbent bed from the interior region does not involve removing any of one or more of the at least one first poppet valve, the at least one second poppet valve or any associated conduits from the adsorbent bed unit.

11. The process of claim 1, wherein:
    the housing includes a body portion secured between a first head and a second head;
    the at least one first poppet valve is secured to the housing; and
    the adsorbent bed is comprised of an adsorbent material supported on a non-adsorbent support, such support containing substantially parallel flow channels; and the adsorbent bed may be removed and replaced by access to the interior region which is achieved by removing the first head without removing the at least one first poppet valve from the housing.

12. The process of claim 11, wherein:
    the at least one first poppet valve is one of a plurality of first poppet valves wherein the plurality of first poppet valves are secured to the housing; and
    the adsorbent bed may be removed and replaced by access to the interior region which is achieved by removing the first head without removing the plurality of first poppet valves from the housing.

13. The process of claim 12, wherein:
    the one or more product poppet valves secured to the second head; and
    each of the one or more product poppet valves has a valve cross sectional area disposed at least partially within the interface cross sectional area of the adsorbent bed.

14. The process of claim 13, wherein there is a plurality of product poppet valves secured to the second head.

15. The process of claim 11, wherein the housing is configured to maintain a pressure from 5 pounds per square inch absolute (psia) and 1,400 psia.

16. The process of claim 12, wherein the plurality of first poppet valves are each an actively-controlled valve.

17. The process of claim 14, wherein the plurality of product poppet valves are each an actively-controlled valve.

18. The process of claim 1, further comprising wherein the fluid flow is hindered from flowing between the housing and the adsorbent bed by a bypass seal disposed between the adsorbent bed and the housing.

19. The process of claim 1, further comprising a flow vane disposed within the first head which distributes the fluid flow from the feed inlet conduit to the adsorbent bed.

20. The process of claim 1, further comprising wherein feed inlet conduit comprises one or more structural elements to direct the flow through the feed inlet conduit to maintain a near plug flow regime through the conduit.

\* \* \* \* \*